US012320260B2

(12) United States Patent
Heeter et al.

(10) Patent No.: US 12,320,260 B2
(45) Date of Patent: Jun. 3, 2025

(54) SEGMENTED VARIABLE FAN OUTLET GUIDE VANE WITH CAM ASSEMBLY AND UNIQUE ACTUATION MECHANISMS

(71) Applicant: Rolls-Royce North American Technologies Inc., Indianapolis, IN (US)

(72) Inventors: Robert W. Heeter, Indianapolis, IN (US); Daniel E. Molnar, Jr., Indianapolis, IN (US); Gregory J. Hebert, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/600,600

(22) Filed: Mar. 8, 2024

(65) Prior Publication Data

US 2024/0309773 A1 Sep. 19, 2024

Related U.S. Application Data

(60) Provisional application No. 63/452,863, filed on Mar. 17, 2023.

(51) Int. Cl.
*F01D 17/16* (2006.01)
*F01D 17/00* (2006.01)

(52) U.S. Cl.
CPC ........... *F01D 17/162* (2013.01); *F01D 17/00* (2013.01); *F05D 2220/36* (2013.01); *F05D 2260/56* (2013.01); *F05D 2260/75* (2013.01)

(58) Field of Classification Search
CPC . F01D 17/16–167; F04D 29/46; F04D 29/462
See application file for complete search history.

(56) References Cited

U.S. PATENT DOCUMENTS

| | | | |
|---|---|---|---|
| 3,237,918 | A | 3/1966 | Le et al. |
| 3,397,836 | A | 8/1968 | Badger et al. |
| 3,632,224 | A | 1/1972 | Wright et al. |
| 3,887,297 | A | 6/1975 | Welchek |
| 4,053,256 | A | 10/1977 | Hertel |
| 4,705,452 | A | 11/1987 | Karadimas |
| 4,791,783 | A | 12/1988 | Neitzel |

(Continued)

FOREIGN PATENT DOCUMENTS

| | | | | |
|---|---|---|---|---|
| EP | 2659112 B1 | * 10/2020 | ........... | F01D 17/162 |
| GB | 893054 A | * 4/1962 | | |

*Primary Examiner* — Christopher R Legendre
(74) *Attorney, Agent, or Firm* — Barnes & Thornburg

(57) ABSTRACT

A fan assembly for a gas turbine engine includes a fan duct, a fan, and an outlet guide vane assembly located in the fan duct axially downstream of the fan. The outlet guide vane assembly includes a first variable leading edge outlet guide vane that extends radially relative to the central axis and includes a leading edge portion and a fixed aft portion, the leading edge portion including a tip segment configured to rotate about a leading edge pitch axis and a hub segment located radially inward of and separate from the tip segment, the hub segment configured to independently rotate about the leading edge pitch axis relative to the tip segment. The assembly further includes two unique actuation assemblies each including a cam rod and cams located thereon that are configured to rotate a respective tip or hub segment.

20 Claims, 21 Drawing Sheets

(56) References Cited

U.S. PATENT DOCUMENTS

| | | | | |
|---|---|---|---|---|
| 4,832,568 | A | 5/1989 | Roth et al. | |
| 4,995,786 | A | 2/1991 | Wheeler et al. | |
| 5,074,752 | A | 12/1991 | Murphy et al. | |
| 5,259,187 | A | 11/1993 | Dunbar et al. | |
| 5,314,301 | A | 5/1994 | Knight | |
| 5,494,404 | A | 2/1996 | Furseth et al. | |
| 6,179,559 | B1 | 1/2001 | Weaver | |
| 6,283,705 | B1 | 9/2001 | Rice et al. | |
| 6,371,725 | B1 | 4/2002 | Manteiga et al. | |
| 6,619,916 | B1 | 9/2003 | Capozzi et al. | |
| 7,114,911 | B2 | 10/2006 | Martin et al. | |
| 7,118,331 | B2 | 10/2006 | Shahpar | |
| 7,444,802 | B2 | 4/2008 | Parry | |
| 7,722,321 | B2 | 5/2010 | Lhoest et al. | |
| 7,730,714 | B2 | 6/2010 | Wood et al. | |
| 7,942,632 | B2 | 5/2011 | Lord et al. | |
| 7,959,408 | B2 | 6/2011 | Belmonte | |
| 8,066,474 | B1 | 11/2011 | Jansen et al. | |
| 8,333,546 | B2 | 12/2012 | Colotte et al. | |
| 8,469,662 | B2 | 6/2013 | Lebrun et al. | |
| 8,641,367 | B2 | 2/2014 | Norris et al. | |
| 8,727,697 | B2 | 5/2014 | Eifert | |
| 8,915,703 | B2 * | 12/2014 | Mohammed .......... | F01D 17/162 415/160 |
| 9,091,174 | B2 | 7/2015 | Bagnall | |
| 9,103,228 | B2 | 8/2015 | Waugh et al. | |
| 9,157,366 | B2 | 10/2015 | Bernard | |
| 9,303,520 | B2 | 4/2016 | Hasting et al. | |
| 9,303,531 | B2 | 4/2016 | Hasting et al. | |
| 9,506,361 | B2 | 11/2016 | Fielding et al. | |
| 9,617,868 | B2 | 4/2017 | Bloxham et al. | |
| 9,885,291 | B2 | 2/2018 | Lecordix et al. | |
| 9,957,823 | B2 | 5/2018 | Epstein | |
| 10,100,663 | B2 | 10/2018 | Longworth et al. | |
| 10,247,018 | B2 | 4/2019 | Topol et al. | |
| 10,259,565 | B2 | 4/2019 | Ramakrishnan et al. | |
| 10,288,079 | B2 | 5/2019 | Skertic | |
| 10,458,261 | B2 | 10/2019 | Got et al. | |
| 10,495,108 | B2 | 12/2019 | Conner et al. | |
| 10,508,660 | B2 | 12/2019 | Hall et al. | |
| 10,527,060 | B2 | 1/2020 | Reynolds et al. | |
| 10,563,593 | B2 | 2/2020 | McNeil et al. | |
| 10,711,626 | B2 | 7/2020 | Humhauser et al. | |
| 10,737,801 | B2 | 8/2020 | Sands et al. | |
| 10,738,627 | B2 | 8/2020 | Gallagher et al. | |
| 10,794,281 | B2 | 10/2020 | Nestico et al. | |
| 10,815,802 | B2 | 10/2020 | Prasad | |
| 10,907,489 | B2 | 2/2021 | Papin et al. | |
| 11,131,323 | B2 | 9/2021 | Suciu et al. | |
| 11,384,656 | B1 * | 7/2022 | Knechtel ............... | F04D 29/563 |
| 11,542,864 | B2 | 1/2023 | Bryan | |
| 11,788,429 | B2 * | 10/2023 | Hall ........................ | F01D 17/02 415/17 |
| 2005/0147492 | A1 | 7/2005 | Mahoney et al. | |
| 2007/0119150 | A1 | 5/2007 | Wood et al. | |
| 2009/0297334 | A1 | 12/2009 | Norris et al. | |
| 2010/0014977 | A1 | 1/2010 | Shattuck | |
| 2011/0167792 | A1 | 7/2011 | Johnson et al. | |
| 2012/0163960 | A1 | 6/2012 | Ress et al. | |
| 2013/0276425 | A1 | 10/2013 | Rittenhouse | |
| 2013/0319009 | A1 | 12/2013 | Parente | |
| 2016/0333729 | A1 | 11/2016 | Miller et al. | |
| 2017/0058831 | A1 | 3/2017 | Bryan et al. | |
| 2017/0218842 | A1 | 8/2017 | Nestico et al. | |
| 2020/0088108 | A1 | 3/2020 | Klein et al. | |
| 2024/0309767 | A1 * | 9/2024 | Heeter .................. | F01D 17/162 |
| 2024/0309773 | A1 * | 9/2024 | Heeter .................. | F01D 17/162 |

* cited by examiner

SEGMENTED VARIABLE FAN OUTLET GUIDE VANE WITH CAM ASSEMBLY AND UNIQUE ACTUATION MECHANISMS

CROSS-REFERENCE TO RELATED APPLICATIONS

This application claims the benefit under 35 U.S.C. § 119(e) of U.S. Provisional Application Ser. No. 63/452,863, filed on Mar. 17, 2023, the entire disclosure of which is incorporated herein by reference.

STATEMENT REGARDING FEDERALLY SPONSORED RESEARCH OR DEVELOPMENT

Embodiments of the present disclosure were made with government support under Contract No. FA8650-19-F-2078 awarded by the U.S. Air Force. The government may have certain rights.

FIELD OF THE DISCLOSURE

The present disclosure relates generally to gas turbine engines, and more specifically to fan assemblies of gas turbine engines.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines also typically include a fan positioned within an inlet duct of the gas turbine engine. The fan includes rotating blades that that force air into the compressor section of the engine, as well as potentially providing additional thrust via forcing air around the engine core through bypass ducts. The fan blades may experience various operability issues due to factors such as variations in the intake airflow and pressure fluctuations within the inlet and the bypass ducts.

SUMMARY

The present disclosure may comprise one or more of the following features and combinations thereof.

A fan assembly for a gas turbine engine according to the present disclosure includes a fan duct arranged circumferentially around a central axis, a fan comprising a plurality of fan blades that extend radially outward relative to the central axis and that are adapted to rotate about the central axis to force fan exit air toward an aft end of the fan duct, and an outlet guide vane assembly located in the fan duct axially downstream of the fan and configured to adjust a direction of incoming fan exit air received from the plurality of fan blades and reduce incidence between the outlet guide vane assembly and the fan exit air.

The outlet guide vane assembly includes a first variable leading edge outlet guide vane that extends radially relative to the central axis and includes a leading edge portion and a fixed aft portion, the leading edge portion including a first tip segment configured to rotate about a leading edge pitch axis and a first hub segment located radially inward of and separate from the first tip segment, the first hub segment configured to independently rotate about the leading edge pitch axis relative to the first tip segment, a first actuation assembly including a first cam rod and a first cam fixedly coupled to the first cam rod, wherein the first cam rod is configured to be selectively rotated so as to selectively rotate the first cam, wherein rotation of the first cam causes rotation of the first tip segment about the leading edge pitch axis to a first pitch angle relative to the incoming fan exit air, and a second actuation assembly including a second cam rod and a second cam fixedly coupled to the second cam rod, wherein the second cam rod is configured to be selectively rotated independent of the first cam rod so as to selectively rotate the second cam, rotation of the second cam causes rotation of the first hub segment about the leading edge pitch axis to a second pitch angle relative to the incoming fan exit air.

In some embodiments, the first and second cams are configured to be selectively clocked to unique rotational positions on the first and second cam rods such that rotation of the first and second cams causes the first tip segment to be rotated to a first pitch angle relative to the incoming fan exit air and the first hub segment to be rotated to a second angle relative to the incoming fan exit air, and the first actuation assembly is configured to rotate the first tip segment to the first pitch angle and the second actuation assembly is configured to rotate the first hub segment to the second pitch angle which is different than the first pitch angle.

In some embodiments, the first actuation assembly further includes a first cam actuation rod rotatably coupled to the first tip segment and extending axially aft therefrom toward the first cam, and the second actuation assembly further includes a second cam actuation rod rotatably coupled to the first hub segment extending axially aft therefrom toward the second cam.

In some embodiments, an axially aft end of the first cam actuation rod engages an axially forward facing surface of the first cam such that rotation the first cam in a first rotational direction causes the axially forward facing surface to move the first cam actuation rod axially forward, and an axially aft end of the second cam actuation rod engages an axially forward facing surface of the second cam such that rotation the second cam in the first rotational direction causes the axially forward facing surface to move the second cam actuation rod axially forward.

In some embodiments, the first cam actuation rod is rotatably coupled to the first tip segment at a point offset from the leading edge pitch axis in a circumferential direction such that axially forward movement of the first cam actuation rod rotates the first tip segment in the first rotational direction, and the second cam actuation rod is rotatably coupled to the first hub segment at a point offset from the leading edge pitch axis in the circumferential direction such that axially forward movement of the second cam actuation rod rotates the first hub segment in the first rotational direction.

In some embodiments, the first tip segment includes a first cam actuation rod receiving recess formed at least partially in an aft side of the first tip segment, the first cam actuation rod is rotatably mounted within the first cam actuation rod receiving recess, the first hub segment includes a second cam actuation rod receiving recess formed at least partially in an aft side of the first hub segment, and the second cam actuation rod is rotatably mounted within the second cam actuation rod receiving recess.

In some embodiments, the first actuation assembly is arranged radially outward of the fixed aft portion and includes a first actuation head, the first cam rod is fixedly coupled to the first actuation head such that rotation of the first actuation head causes rotation of the first cam rod, the second actuation assembly is arranged radially inward of the fixed aft portion and includes a second actuation head, and the second cam rod is fixedly coupled to the second actuation head such that rotation of the second actuation head causes rotation of the second cam rod.

In some embodiments, the first actuation assembly further includes a first actuation arm coupled to the first actuation head and extending generally axially aft therefrom, pivoting of the first actuation arm about a rotation axis of the first actuation head causes rotation of the first actuation head which causes rotation of the first cam rod, the second actuation assembly further includes a second actuation arm coupled to the second actuation head and extending generally axially aft therefrom, and pivoting of the second actuation arm about a rotation axis of the second actuation head causes rotation of the second actuation head which causes rotation of the second cam rod.

In some embodiments, the outlet guide vane assembly further includes a first annular ring extending circumferentially about the central axis, wherein an axially aft end of the first actuation arm is connected to the first annular ring, and circumferential movement of the first annular ring causes movement of the first actuation arm generally circumferentially relative to the first actuation head which causes the first actuation arm to pivot about the rotation axis of the first actuation head which causes rotation of the first actuation head which causes rotation of the first cam rod.

In some embodiments, the outlet guide vane assembly further includes a second annular ring extending circumferentially about the central axis, an axially aft end of the second actuation arm is connected to the second annular ring, and wherein circumferential movement of the second annular ring causes movement of the second actuation arm generally circumferentially relative to the second actuation head which causes the second actuation arm to pivot about the rotation axis of the second actuation head which causes rotation of the second actuation head which causes rotation of the second cam rod.

In some embodiments, the first cam rod and the second cam rod are radially spaced apart.

In some embodiments, the first variable leading edge outlet guide vane further includes a central segment arranged between the first tip segment and the first hub segment such that the first tip segment and the first hub segment are radially spaced apart.

In some embodiments, the central segment is coupled to and extends axially away from an axially forward side of the fixed aft portion.

According to a further aspect of the present disclosure, a fan assembly for a gas turbine engine includes a fan duct arranged circumferentially around a central axis, a fan adapted to rotate about the central axis to force fan exit air toward an aft end of the fan duct, and an outlet guide vane assembly located in the fan duct axially downstream of the fan and configured to adjust a direction of incoming fan exit air received from the plurality of fan blades and reduce incidence between the outlet guide vane assembly and the fan exit air.

The outlet guide vane assembly includes a first variable leading edge outlet guide vane that extends radially relative to the central axis and includes a leading edge portion and a fixed aft portion, the leading edge portion including a first tip segment configured to rotate about a leading edge pitch axis and a first hub segment located radially inward of and separate from the first tip segment, the first hub segment configured to independently rotate about the leading edge pitch axis relative to the first tip segment, a first actuation assembly including a first cam, wherein rotation of the first cam is configured to cause rotation of the first tip segment about the leading edge pitch axis to a first pitch angle relative to the incoming fan exit air, and a second actuation assembly including a second cam configured to be selectively rotated independent of the first cam, wherein rotation of the second cam is configured to cause rotation of the first hub segment about the leading edge pitch axis to a second pitch angle relative to the incoming fan exit air.

In some embodiments, the first actuation assembly further includes a first cam rod, wherein the first cam is fixedly coupled to the first cam rod, the first cam rod is configured to be selectively rotated so as to selectively rotate the first cam, wherein the second actuation assembly further includes a second cam rod, the second cam is fixedly coupled to the second cam rod, and the second cam rod is configured to be selectively rotated independent of the first cam rod so as to selectively rotate the second cam.

In some embodiments, the first and second cams are configured to be selectively clocked to unique rotational positions on the first and second cam rods such that rotation of the first and second cams causes the first tip segment to be rotated to a first pitch angle relative to the incoming fan exit air and the first hub segment to be rotated to a second angle relative to the incoming fan exit air.

In some embodiments, the first actuation assembly further includes a first cam actuation rod rotatably coupled to the first tip segment and extending axially aft therefrom toward the first cam, and the second actuation assembly further includes a second cam actuation rod rotatably coupled to the first hub segment extending axially aft therefrom toward the second cam.

In some embodiments, an axially aft end of the first cam actuation rod engages an axially forward facing surface of the first cam such that rotation the first cam in a first rotational direction causes the axially forward facing surface to move the first cam actuation rod axially forward, and an axially aft end of the second cam actuation rod engages an axially forward facing surface of the second cam such that rotation the second cam in the first rotational direction causes the axially forward facing surface to move the second cam actuation rod axially forward.

In some embodiments, the first cam actuation rod is rotatably coupled to the first tip segment at a point offset from the leading edge pitch axis in a circumferential direction such that axially forward movement of the first cam actuation rod rotates the first tip segment in the first rotational direction, and the second cam actuation rod is rotatably coupled to the first hub segment at a point offset from the leading edge pitch axis in the circumferential direction such that axially forward movement of the second cam actuation rod rotates the first hub segment in the first rotational direction.

According to a further aspect of the present disclosure, a method comprises arranging a fan duct circumferentially around a central axis, providing a fan comprising a plurality of fan blades that extend radially outward relative to the central axis and that are adapted to rotate about the central axis to force fan exit air toward an aft end of the fan duct, arranging an outlet guide vane assembly in the fan duct axially downstream of the fan and configured to adjust a direction of incoming fan exit air received from the plurality of fan blades and reduce incidence between the outlet guide vane assembly and the fan exit air, the outlet guide vane assembly including a first variable leading edge guide vane that extends radially relative to the central axis and includes a leading edge portion and a fixed aft portion, the leading edge portion including a first tip segment configured to rotate about a leading edge pitch axis and a first hub segment located radially inward of and separate from the first tip segment, the first hub segment configured to independently rotate about the leading edge pitch axis relative to the first tip segment, arranging a first actuation assembly relative to the first tip segment, the first actuation assembly including a first cam rod and a first cam fixedly coupled to the first cam rod, wherein the first cam rod is configured to be selectively rotated so as to selectively rotate the first cam, wherein rotation of the first cam causes rotation of the first tip segment about the leading edge pitch axis to a first pitch angle relative to the incoming fan exit air, and arranging a second actuation assembly relative to the first hub segment, the second actuation assembly including a second cam rod and a second cam fixedly coupled to the second cam rod, wherein the second cam rod is configured to be selectively rotated independent of the first cam rod so as to selectively rotate the second cam, wherein rotation of the second cam causes rotation of the first hub segment about the leading edge pitch axis to a second pitch angle relative to the incoming fan exit air.

These and other features of the present disclosure will become more apparent from the following description of the illustrative embodiments.

DETAILED DESCRIPTION

Figure 1:
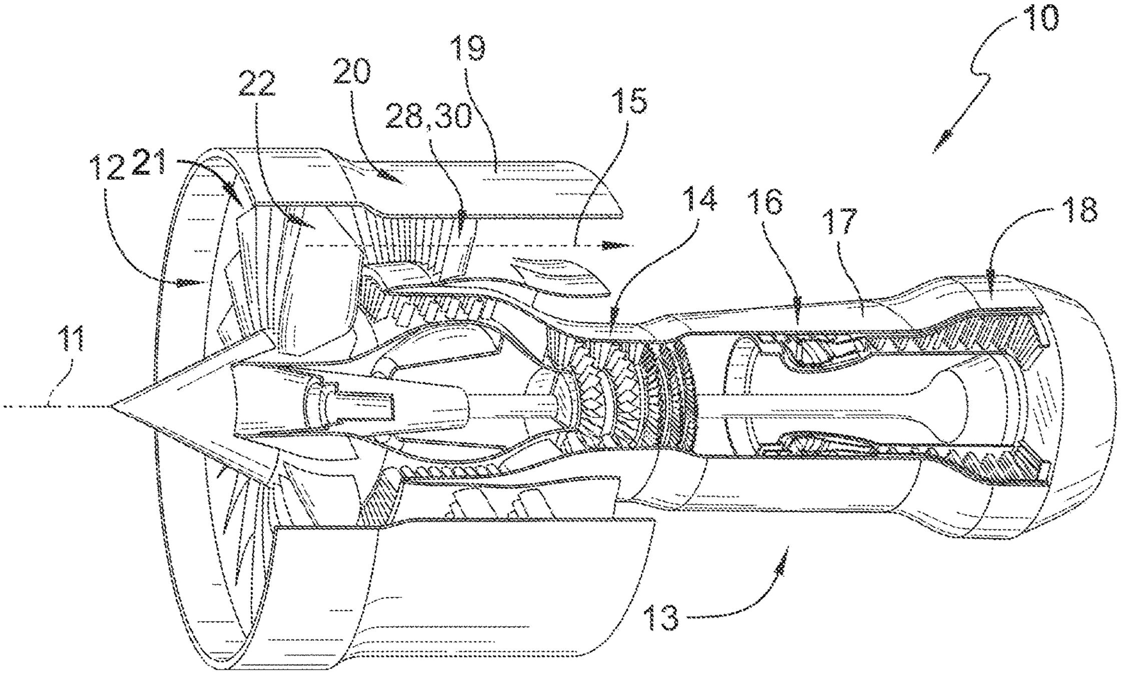
FIG. 1 is a cutaway view of a gas turbine engine that includes a fan assembly having a fan having plurality of fan blades that extend radially outward relative to the central axis, an engine core having a compressor, a combustor, and a turbine, and an outlet guide vane assembly located in a fan duct axially downstream of the plurality of fan blades that is configured to reduce the incidence between the outlet guide vane assembly and the fan exit air received from the fan blades and return the flow to generally axial flow.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan assembly 12 and an engine core 13 having a compressor 14, a combustor 16, and a turbine 18, as shown in FIG. 1. The fan assembly 12 is driven by the turbine 18 and provides thrust for propelling an air vehicle by forcing fan exit air 15 through a fan duct 20 that circumferentially surrounds an outer casing 17 of the engine core 13. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12. In some embodiments, the fan may be replaced with a propeller, drive shaft, or other suitable configuration.

Figure 2:
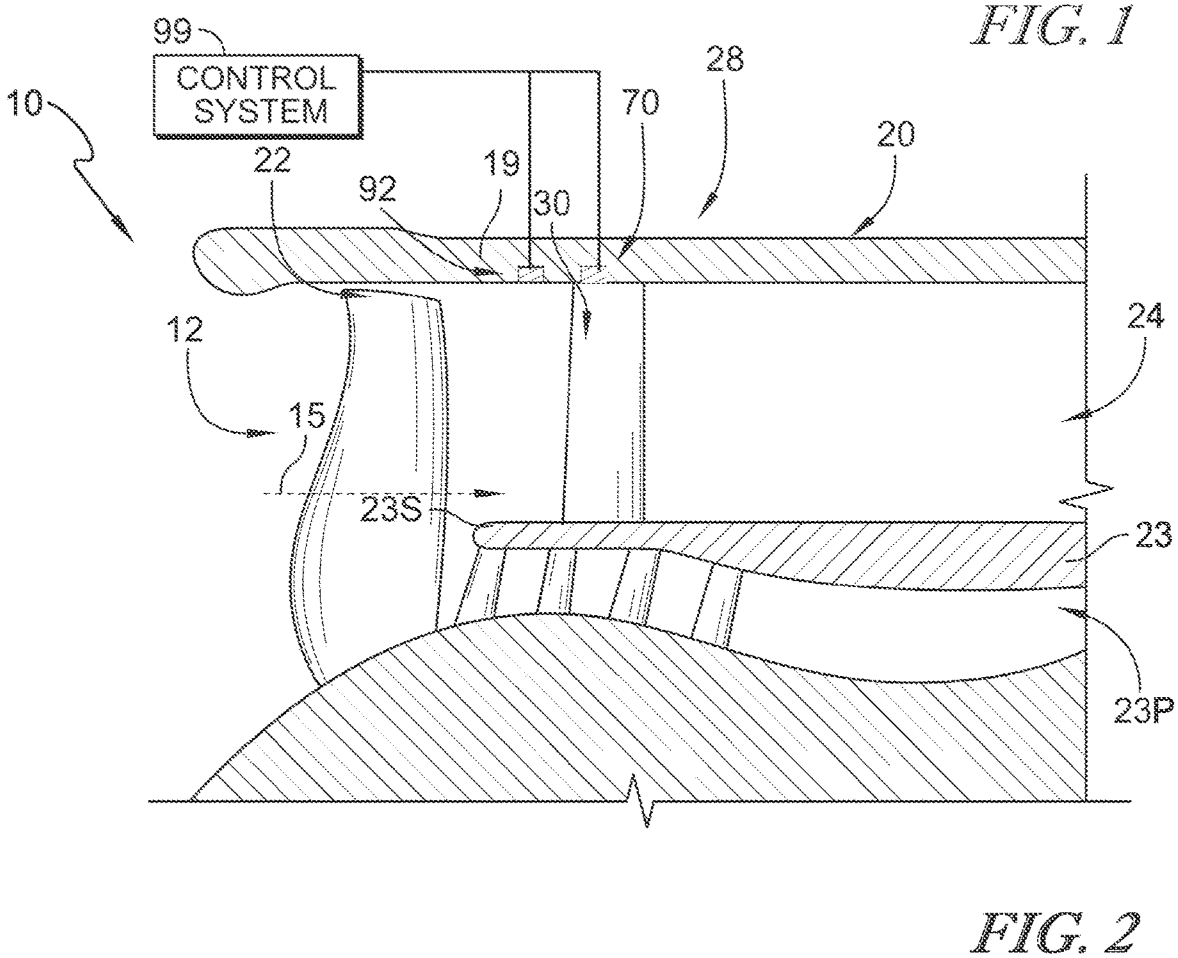
FIG. 2 is a side cross-sectional view of the gas turbine engine of FIG. 1, showing the fan assembly including the plurality of fan blades, showing that the engine further includes an outer casing and an inner wall that define a fan duct passage through which the fan exit air flows, showing that the outlet guide vane assembly includes a first variable leading edge outlet guide vane having a first tip segment and a first hub segment configured to more closely match the vane to distorted fan exit air, and showing that the first tip and hub segments are hinged to each other.

The fan assembly 12 includes a fan 21 having a plurality of fan blades 22 that extend radially outward relative to the central axis 11 and that are located in the inlet of the gas turbine engine 10, as shown in FIGS. 1 and 2. The fan blades 22 direct at least a portion of the air flowing over the blades 22, this portion being fan exit air 15 as shown in FIGS. 1 and 2, through the fan duct 20 such that the fan exit air 15 bypasses the engine core 13 and provides additional thrust for the gas turbine engine 10. The fan duct 20 includes an outer fan duct casing 19 and an inner wall 23 that together define an annular fan duct passage 24 through which the fan exit air 15 flows and subsequently exits the fan duct 20 into the ambient air surrounding the engine 10. The inner wall 23 may include an axially forward end 23S that functions as a splitter such that a portion of the incoming fan exit air 15 enters the engine core through the engine core passage 23P radially inward of the inner wall 23 and a portion of the fan exit air 15 enters the fan duct 20.

Figure 3:
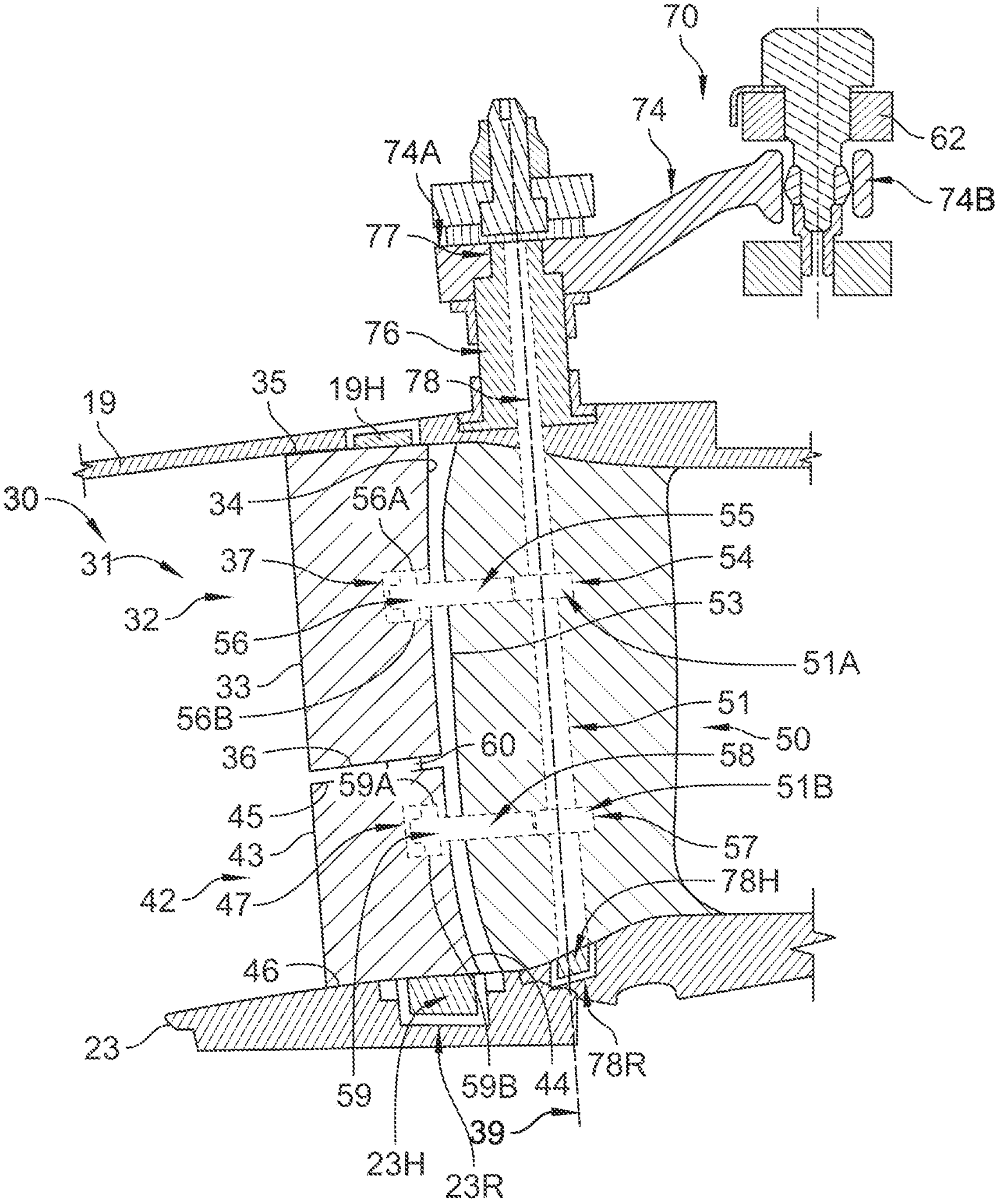
FIG. 3 is a side cross-sectional view of the first variable leading edge outlet guide vane of FIG. 2, showing that the first variable leading edge outlet guide vane includes the first tip segment and the first hub segment, and showing that the outlet guide vane assembly includes a first actuation assembly arranged radially outward of the aft fixed portion and including a cam rod with two cams attached thereto and associated with the first tip and hub segments, rotation of the cam rod causing rotation of the cams which causes rotation of the first tip and hub segments.

In the illustrative embodiment, the fan assembly 12 further includes outlet guide vane assembly 28 located in the fan duct 20 axially downstream of the plurality of fan blades 22 that is configured to reduce the incidence between the outlet guide vane assembly 28 and the fan exit air 15 received from the plurality of fan blades 22 and return the flow to generally axial flow, as shown in FIG. 2. In some embodiments, the outlet guide vane assembly 28 is arranged axially downstream of the axially forward end 23S of the inner wall 23. In the illustrative embodiment, the outlet guide vane assembly 28 includes a first variable leading edge outlet guide vane 30 having a leading edge portion 31 and a fixed aft portion 50, as shown in FIG. 3. The leading edge portion 31 includes a first tip segment 32 configured to rotate about a leading edge pitch axis 39 and a first hub segment 42 located radially inward of and separate from the first tip segment 32, also configured to rotate about the leading edge pitch axis 39.

The first variable leading edge outlet guide vane 30 extends radially outward relative to the central axis 11, as shown in FIG. 3. In some embodiments, the first variable leading edge outlet guide vanes 30 may include a plurality of first variable leading edge outlet guide vanes 30 disposed around a circumferential extent of the inner wall 23 define a first outlet guide vane stage.

Figure 4A:
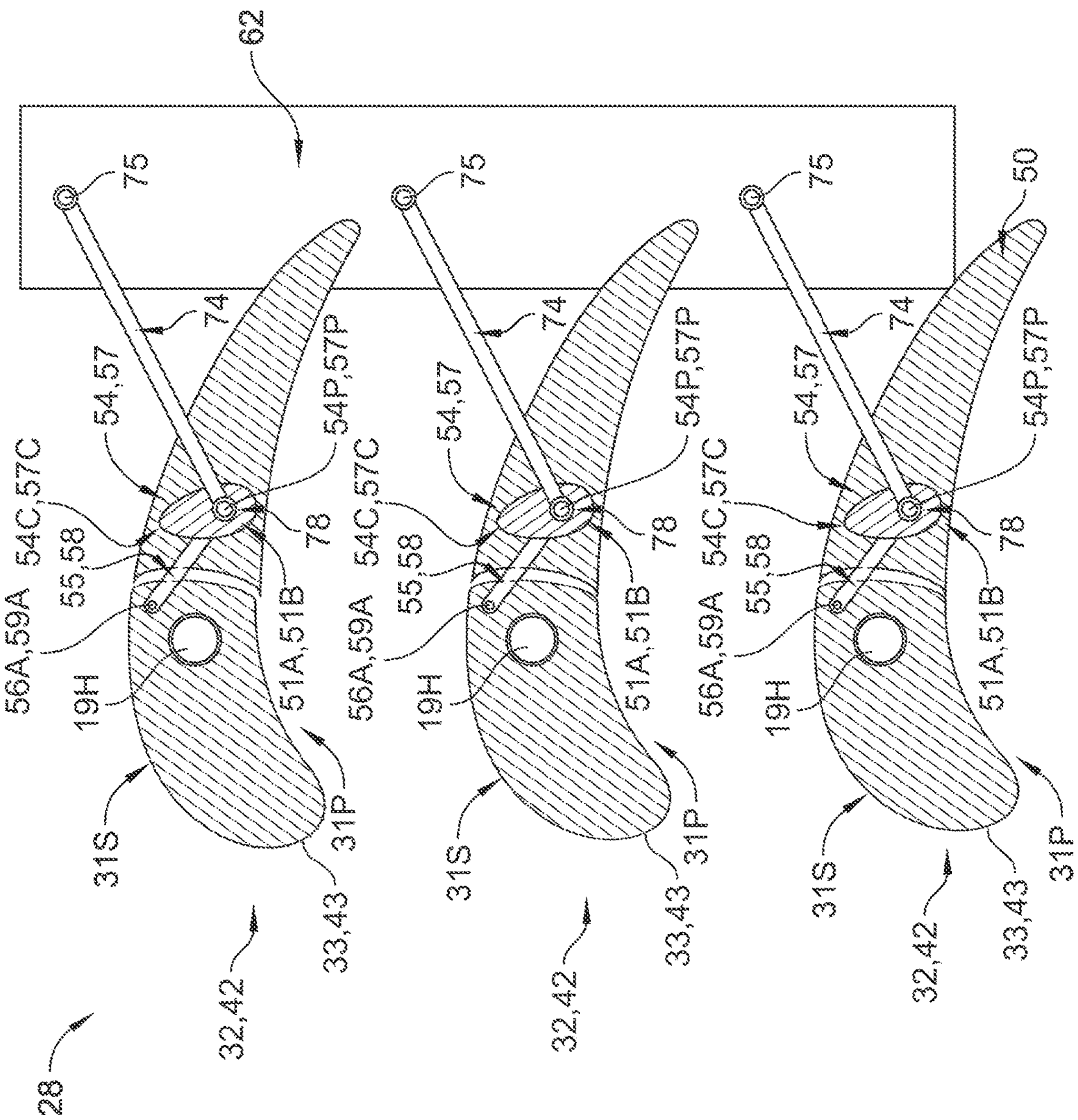
FIG. 4A is a top cross-sectional view of either of the first tip and hub segments of the outlet guide vane of FIG. 3, showing a plurality of outlet guide vanes arranged circumferentially adjacent to each other, and showing that each outlet guide vane can include an actuation assembly having a respective cam rod and cams attached thereto, each configured to rotate a respective first tip or hub segment, and showing that each cam rod can be coupled to an annular ring.
Figure 4B:
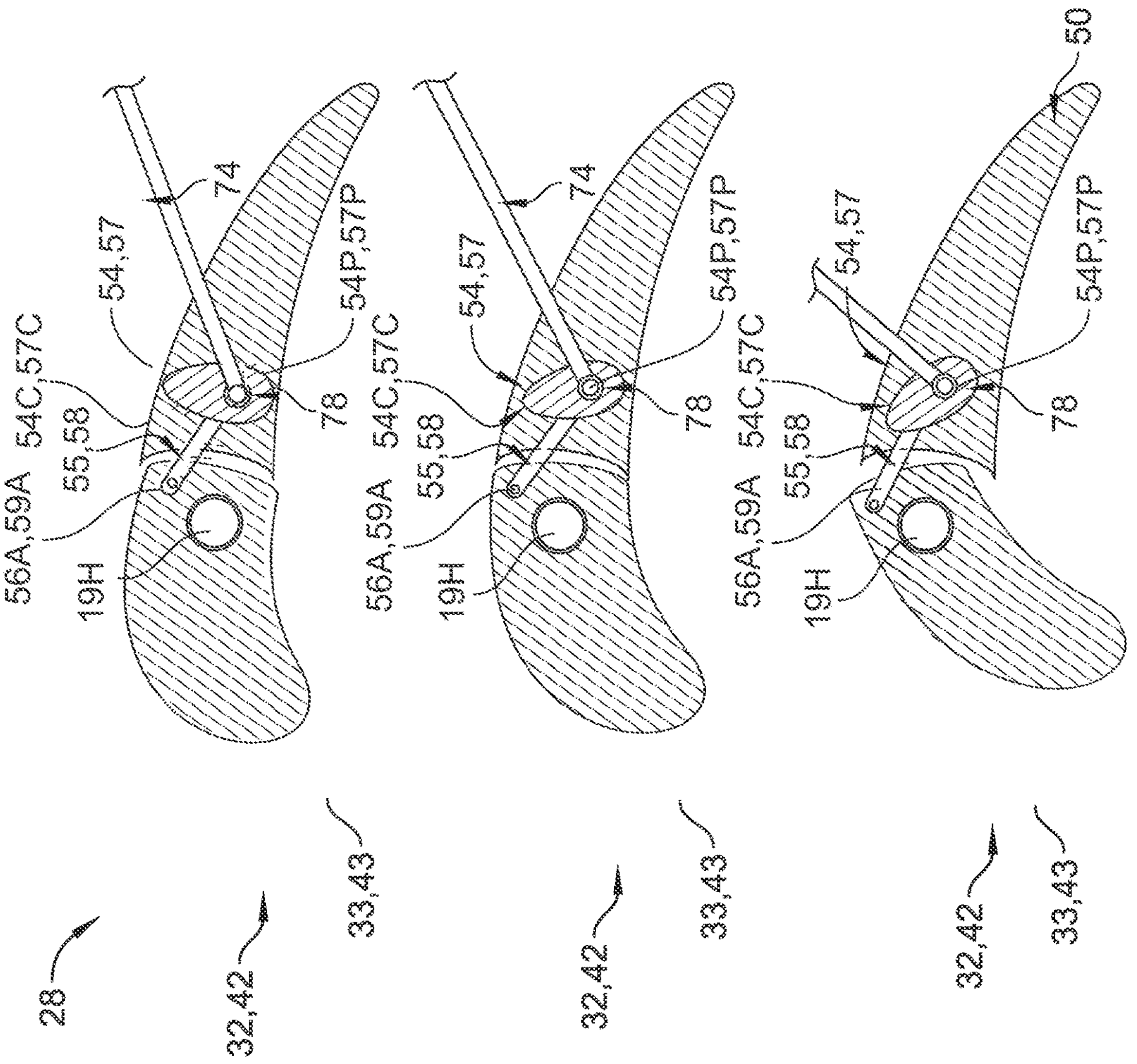
FIG. 4B is a top cross-sectional view of either of the first tip and hub segments of the outlet guide vane of FIG. 3, showing different rotational positions of the first tip or hub segment based on rotational positions of the cam rod.

As shown in FIG. 3 and contextualized in FIG. 4A and FIG. 4B, the first variable leading edge outlet guide vane 30 includes an airfoil shape. The first tip segment 32 includes a leading edge 33 located at a forward end of the segment 32, a trailing edge 34 axially spaced apart from the leading edge 33 and located at an aft end of the segment 32, a radially outer side 35, and a radially inner side 36. Similarly, the first hub segment 42 includes a leading edge 43 located at a forward end of the segment 42, a trailing edge 44 axially spaced apart from the leading edge 43 and located at an aft end of the segment 42, a radially outer side 45, and a radially inner side 46.

Together, the first tip and hub segments 32, 42 form the leading edge portion 31. As shown in FIG. 4A, the leading edge portion 31 and the fixed aft portion 50 together form the overall vane 30, which includes a pressure side surface 31P that extends between the leading edges 33, 43 of the segments 32, 42 and a trailing edge 52 of the fixed aft portion 50 on one side of the vane 30. Similarly, a suction side surface 31S extends between the leading edges 33, 43 of the segments 32, 42 and a trailing edge 52 of the fixed aft portion 50 on an opposing side of the vane 30. Illustratively, the leading edge portion 31 is approximately one-third of the total chord length 30H of the vane 30, while the fixed aft portion 50 is approximately two-thirds of the total chord length 30H. In other embodiments, the leading edge portion 31 is approximately one-fourth of the total chord length 30H of the vane 30, while the fixed aft portion 50 is approximately three-fourths of the total chord length 30H. In other embodiments, the leading edge and fixed aft portions 31, 50 are each half the total chord length.

The first tip and hub segments 32, 42 are configured to rotate about the leading edge pitch axis 39, as shown in FIG. 3. In the illustrative embodiment, the leading edge pitch axis 39 is located closer to the trailing edges 34, 44 of the segments 32, 42 than the leading edges 33, 43. In this manner, the first tip and hub segments 32, 42 can rotate proximate to the fixed aft portion 50 such that airflow remains uninterrupted while flowing over the vane 30. In some embodiments, a hub member 19H of the first tip segment 32 is rotatably coupled to the outer fan duct casing 19 within a hub receiving recess 19R. Similarly a hub member 23H of the first hub segment 42 is rotatably coupled to the inner wall 23 within a hub receiving recess 23R.

The first hub segment 42 is configured to independently rotate about the leading edge pitch axis 39 relative to the first tip segment 32, and may include a small radial gap therebetween. In some embodiments, the first hub segment 42 can include a hinge rod 60 extending radially outwardly from the radially outer side 45 of the first hub segment 42 and rotatably received within the radially inner side 36 of the first tip segment 32 to add stability to the rotation of the two segments 32, 42 relative to each other while allowing for independent rotation. The hinge rod 60 of the first hub segment 42 can be cylindrical and aligned with the leading edge pitch axis 39. In some embodiments in which the first tip and hub segments 32, 42 are formed of a sufficiently stiff material, a hinge rod may be omitted.

To rotate independently, the illustrative embodiment of the outlet guide vane assembly 28 includes a first actuation assembly 70 associated with the first tip and hub segments 32, 42. Illustratively, the first actuation assembly 70 includes a first actuation arm 74, a first actuation head 76, and a cam rod 78 fixedly couple to the first actuation head 76 and extending radially. The first actuation assembly 70 further includes a first cam 54 and a second cam 57 selectively coupled to the cam rod 78 and spaced apart from each other in the radial direction along the length of the cam rod 78. The cams 54, 57 engage cam actuation rods 55, 58 that are rotatably coupled to the first tip and hub segments 32, 42, respectively, which in turn rotates the first tip and hub segments 32, 42. As will be described in detail below, the cams 54, 57 may be selectively clocked along the cam rod 78 so as to preselect pitch angles to which rotation of the cams 54, 57 will rotate the first tip and hub segments 32, 42.

Illustratively, the first actuation arm 74 and the first actuation head 76 are arranged radially outward of the fixed aft portion 50, as shown in FIG. 3. Although the first actuation head 76 is shown in this manner, and the cam rod 78 is shown as extending radially inwardly away from the first actuation head 76, one of ordinary skill in the art would understand that the actuation assembly components could be arranged oppositely, in particular having the first actuation head 76 arranged radially inward of the fixed aft portion 50, and thus having the cam rod 78 extending radially outwardly away from the first actuation head 76.

In some embodiments, the first actuation arm 74 extending axially away from the first actuation head 76, as shown in FIG. 3. In some embodiments, the first actuation head 76 extends into and is supported by the outer fan duct casing 19 and is fixedly coupled to the cam rod 78 which extends radially therefrom. As shown in FIG. 3, the first actuation head 76 is axially offset in the aft direction from the leading edge pitch axis 39. In some embodiments, the cam rod 78 is arranged closer to the forward side 53 of the fixed aft portion 50 than the trailing edge 52. In particular, the cam rod 78 is located approximately halfway along the chord length (30H) of the vane 30, or slightly offset therefrom. For example, the cam rod 78, which rotates the cams 54, 57 about their pivot axes, is located slightly axially aft of the halfway point 30H of the chord length.

In some embodiments, the actuation head 76 is cylindrical having a central axis 76C that aligns with a central axis 78C of the of the cam rod 78. The first actuation head 76 is fixedly arranged within an opening 77 formed at a first end 74A of the first actuation arm 74. As a result, pivoting movement of the first actuation arm 74 about the actuation head 76 central axis 76C rotates the first actuation head 76, which in turn rotates the cam rod 78. In some embodiments, the first actuation arm 74 is arranged radially outward of the vane 30 and the outer fan duct casing 19, as shown in FIG. 3.

As shown in FIG. 4A and FIG. 4B, the cam rod 78 is configured to rotate about its central axis 78C, which in turn will rotate the cams 54, 57. Each cam 54, 57 includes a non-circular shape, or a cam shape, having an axially forward facing surface 54C, 57C that is configured to engage an axially aft terminal end of the respective cam actuation rod 55, 58. As shown in FIG. 4A and FIG. 4B, the cam rod 78 may be offset from the fixed aft portion 50 and extend along a side of the fixed aft portion 50, but in other embodiments, as shown in FIG. 3, a cam rod receiving cavity 51 is formed in the fixed aft portion 50 through which the cam rod 78 may extend.

In some embodiments, the cavity 51 include enlarged cavity portions 51A, 51B that contain the cams 54, 57 therein, as shown in FIG. 3 and FIG. 4A. The enlarged cavity portions 51A, 51B are sized so as to contain the cams 54, 57 therein without the cams 54, 57 protruding outwardly beyond the walls of the vane 30. As such, the cams 54, 57 are prevented from interrupting any portion of the air flow over the vane 30. The enlarged cavity portions 51A, 51B may be entirely sealed off from the environment via the pressure and suction side 31P, 31S walls, except for where the actuation rods 55, 58 must extend axially forward out of the fixed aft portion 50 and engage the tip and hub segments 32, 42.

The first cam actuation rod 55 is rotatably coupled to the first tip segment 32 and extends axially aft therefrom toward the first cam 54, as shown in FIGS. 3-4A. Similarly, the second cam actuation rod 58 is rotatably coupled to the first hub segment 42 and extends axially aft therefrom toward the second cam 57. The first cam actuation rod 55 is rotatably coupled to the first tip segment 32 at a point offset from the leading edge pitch axis 39 (centrally located relative to 19H as shown in FIGS. 4A and 4B) in the circumferential direction such that axially forward movement of the first cam actuation rod 55 rotates the first tip segment 32 in the first rotational direction (downward direction when viewing FIGS. 4A and 4B). Similarly, the second cam actuation rod 58 is rotatably coupled to the first hub segment 42 at a point offset from the leading edge pitch axis 39 in the circumferential direction such that axially forward movement of the second cam actuation rod 58 rotates the first hub segment 42 in the first rotational direction. In some embodiments, the connection to the first tip and hub segments 32, 42 is sufficient to support the actuation rods 55, 58, but in other embodiments, the actuation rods 55, 58 may be supported on the fixed aft portion 50 or any other means known in the art.

Illustratively, the first tip segment 32 includes a first cam actuation rod receiving recess 37 formed at least partially in the aft side 34 of the first tip segment 32, as shown in FIG. 3. The first cam actuation rod 55 is rotatably mounted within the first cam actuation rod receiving recess 37. In some embodiments, the forward end of the first cam actuation rod 55 includes radially outer and inner pivot pins 56A, 56B that can be inserted into corresponding holes formed in the recess 37. Similarly, the first hub segment 42 includes a second cam actuation rod receiving recess 47 formed at least partially in the aft side 44 of the first hub segment 42. The second cam actuation rod 58 is rotatably mounted within the second cam actuation rod receiving recess 47. In some embodiments, the forward end of the second cam actuation rod 58 includes radially outer and inner pivot pins 59A, 59B that can be inserted into corresponding holes formed in the recess 47.

In order to rotate the first tip segment 32, an axially aft end of the first cam actuation rod 55 engages the axially forward facing surface 54C of the first cam 54 such that rotation of the first cam 54 in the first rotational direction causes the axially forward facing surface 54C to move the first cam actuation rod 55 axially forward. FIG. 4B shows various rotational positions of the cams 54, 57 and the first tip and hub segments 32, 42. When the first cam actuation rod 55 moves axially forward, the first tip segment 32 is rotated is the first rotation direction. As can be seen in FIG. 4B, the more the cam 54, 57 is rotated, the more the first tip and hub segments 32, 42 rotate.

Similarly, an axially aft end of the second cam actuation rod 58 engages the axially forward facing surface 57C of the second cam 57 such that rotation of the second cam 57 in the first rotational direction causes the axially forward facing surface 57C to move the second cam actuation rod 58 axially forward. When the second cam actuation rod 58 moves axially forward, the first hub segment 42 is rotated is the first rotation direction. In some embodiments, one or both of the actuation rods 55, 58 can include a spring 55S, 58S that returns the actuation rods 55, 58 and thus the first tip and hub segments 32, 42 back in the axially aft direction when the cams 54, 57 are rotated in the opposing, second rotation direction.

Figure 6:
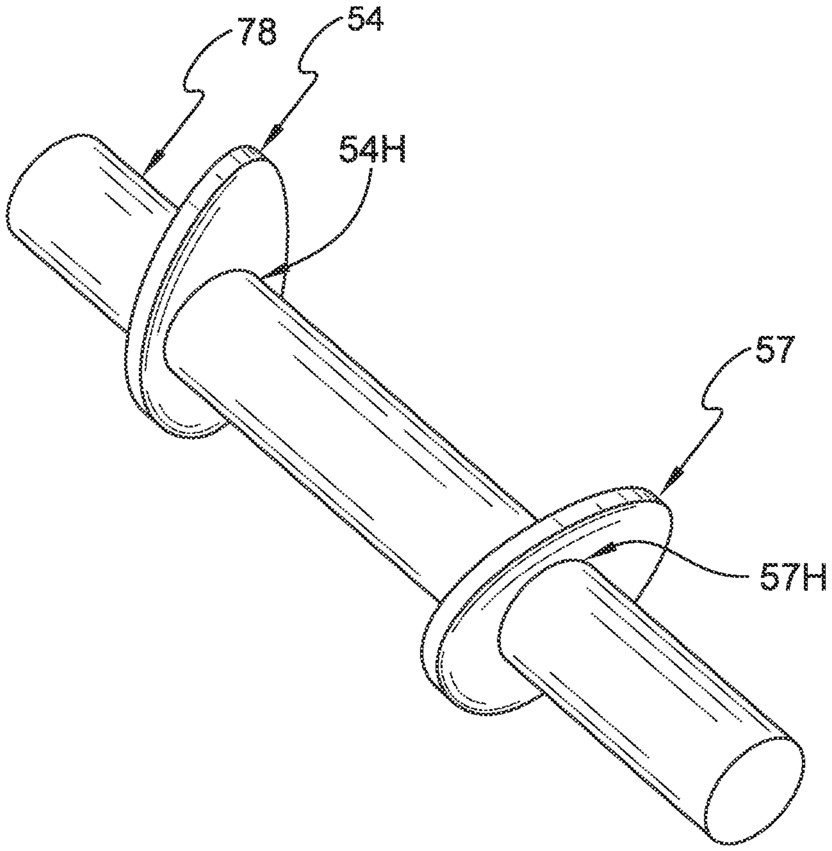
FIG. 6 is a perspective view of the cam rod and cams of the outlet guide vane of FIG. 3.

The cams 54, 57 can be selectively clocked along the cam rod 78 such that their rotation can cause the first tip and hub segments 32, 42 to be rotated to selectable first and second pitch angles, respectively. For example, as can be seen in FIG. 6, the first cam 54 can include a first cam hole 54H through which the cam rod 78 extends, and the second cam 57 can include a second cam hole 57H through which the cam rod 78 extends. The cams 54, 57 can be selectively clocked into place, such as, for example, the position of the first cam 54 and the position of the second cam 57 shown in FIG. 6. Due to the difference in the clocked positions, the first tip and hub segments 32, 42 will move to different pitch angles due to the rotation of the cams 54, 57.

In this way, the first tip and hub segments 32, 42 can be individually controlled with respect to each other to the same or differing angles, thus allowing for a multitude of segment positions and arrangements to be achieved. This provides for great flexibility in managing incoming airflows which may include distortions and disturbances. This can be particularly useful in embedded engine applications with complex intake and inlet duct geometries. In such scenarios, the distortion flows have more significant gradients and vortices, even in flight, so accommodation is necessary to maintain fan operability and performance.

As will be described in greater detail below, the first actuation arm 74 is configured to be moved generally circumferentially relative to the first actuation head 76 by annular rings (such as annular ring 62 shown in FIG. 3 and FIG. 4A), segmented annular rings, or individual actuators so as to pivot the actuation arm 74 about the actuation head 76 central axis 76C. In particular, the actuation arm 74 may be selectively pivoted about the actuation head 76 central axis 76C so as to rotate the cam rod 78 which rotates the first and second cams 54, 57 which rotates the first tip and hub segments 32, 42. As a result, the first tip segment 32 can be selectively rotated about the leading edge pitch axis 39 to a first pitch angle relative to the incoming fan exit air 15. Similarly, the first hub segment 42 can be selectively rotated about the leading edge pitch axis 39 to a second pitch angle relative to the incoming fan exit air 15. The fixed aft edge 50 rotates any flow back to near axial to minimize loss from swirl.

Figure 5A:
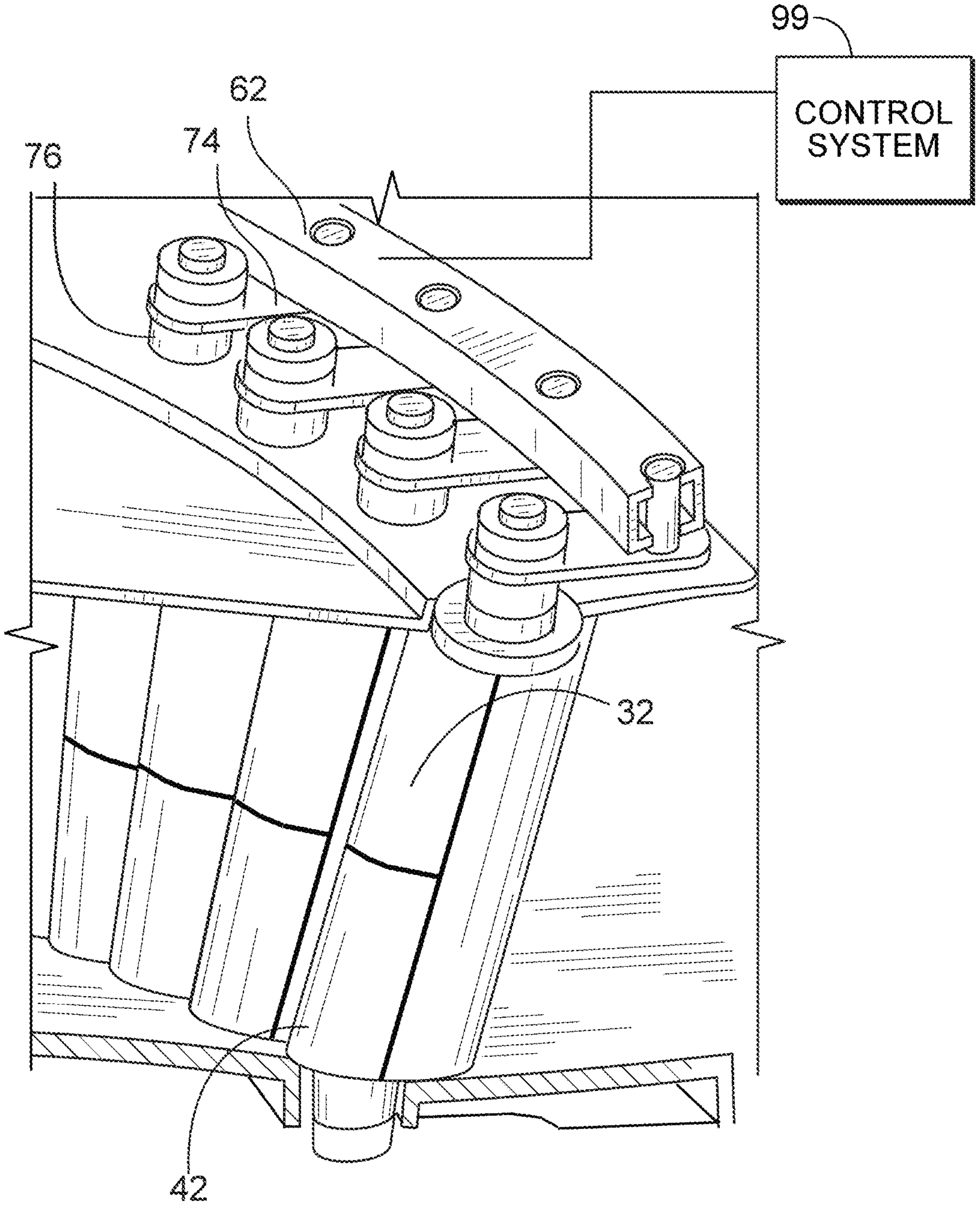
FIG. 5A is a side cutaway perspective view of a plurality of the first variable leading edge outlet guide vanes of FIG. 3, showing that the first actuation heads are connected to a full annular ring via actuation arms.
Figure 5B:
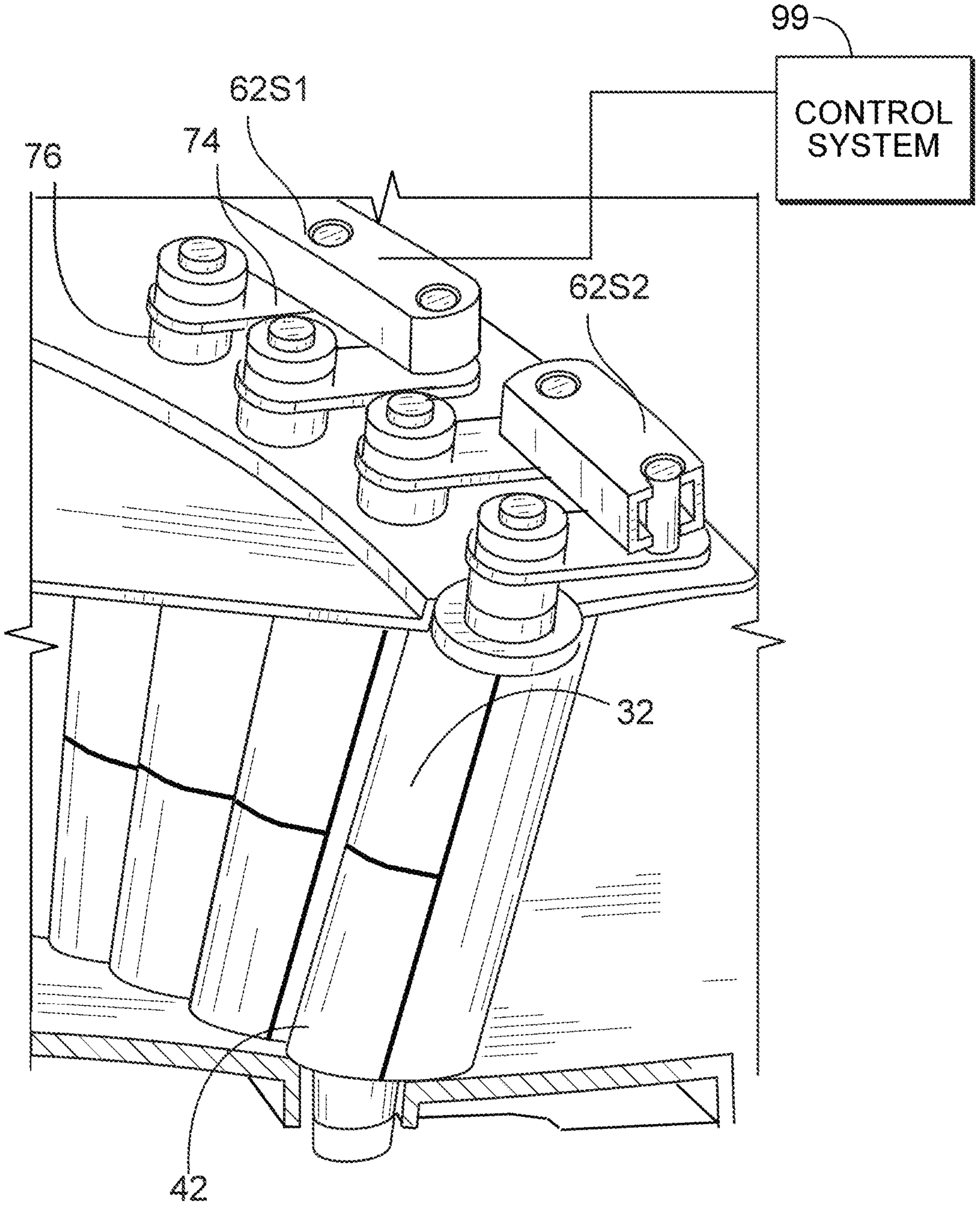
FIG. 5B is a side cutaway perspective view of a plurality of the first variable leading edge outlet guide vanes of FIG. 3, showing that two groups of first actuation heads are connected to annular ring segments via actuation arms, the segments being spaced apart circumferentially.
Figure 5C:
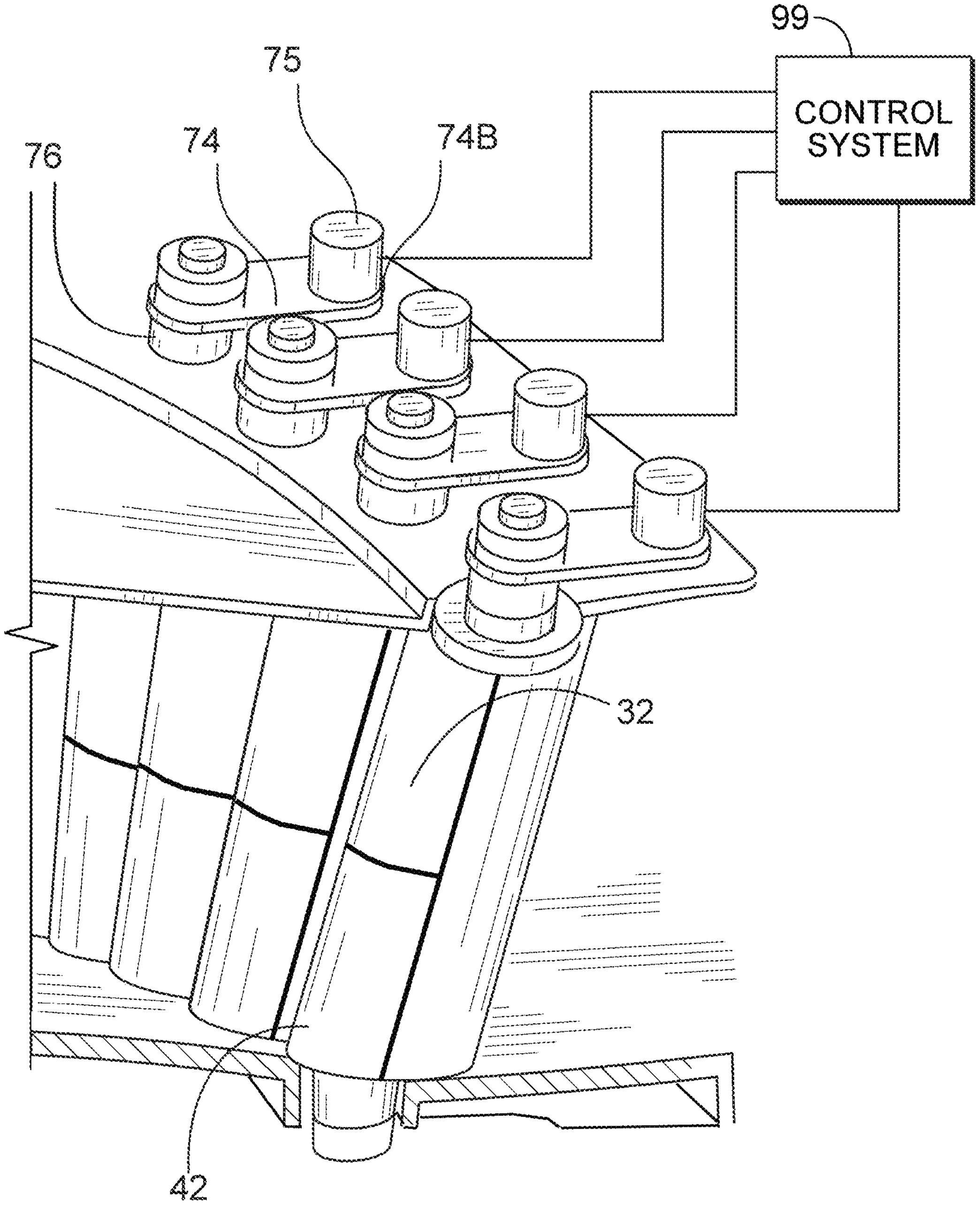
FIG. 5C is a side cutaway perspective view of a plurality of the first variable leading edge outlet guide vanes of FIG. 3, showing that the first actuation heads are each connected to individual actuators, which are connected to a control system.

As shown in FIG. 3, and in greater detail in FIGS. 5A, 5B, 5C, the outlet guide vane assembly 28 can further include a plurality of variable leading edge outlet guide vanes 30 arranged around the entirety of the circumferential extent of the vane assembly 28. The plurality of variable leading edge outlet guide vanes 30 include the first variable leading edge outlet guide vane 30 described above. Each variable leading edge outlet guide vane 30 of the plurality of variable leading edge outlet guide vanes 30 includes a respective tip segment 32 and hub segment 42, as well as the actuation assembly 70. The first actuation arms 74 of each vane 30 may be coupled to an annular rings (for example, first annular ring 62) that extends circumferentially about the central axis 11. The actuation arm 74 may be coupled to the ring 62 via an opening formed at a second end 74B of the actuation arm 74.

As can be seen in FIG. 5A, the outlet guide vane assembly 28 may include a fully annular first annular ring 62. In this configuration, the first annular rings 62 can be configured to rotate about the central axis 11 so as to move the actuation arm 74 coupled thereto generally circumferentially relative to the first actuation head 76, or in other words, to pivot the actuation arm 74 coupled thereto about the actuation head 76 central axis 76C. As a result, the rotation of the first annular ring 62 about the central axis 11 causes the cam rod 78 to rotate, thus causing the cams 54, 57 to rotate, thus causing rotation of the first tip and hub segments 32, 42, respectively. As will be described in detail below, the annular ring 62 may be controlled by a control system 99.

In some scenarios, it may be beneficial to have more control over individual sections of the plurality of variable leading edge outlet guide vanes 30 or individual vanes 30. This may be particular useful when the engine experiences more significantly distorted flows, such as in embedded engine applications. Sectional control or individual control would provide additional flexibility to accommodate as much flow variation as possible to recover operability and performance margins. For example, as an aircraft maneuvers through ground crosswind or variations of flight orientations such as sideslip and pitch variations, the plurality of variable leading edge outlet guide vanes 30 can be rotationally moved in sections or independently to best reset the inlet angles and maximize the fan operability envelope. The optimized rest of the inlet angles improves stall margin, improves efficiency and performance, and reduces fan forcing debits.

As can be seen in FIG. 5B, first annular ring 62 may be broken up into segments so as to include multiple circumferential segments disposed about the central axis 11. In particular, the multiple circumferential segments are radially aligned with each other and circumferentially spaced apart. For example, the assembly 28 may include a first annular ring segment 62S1 and a second annular ring segment 62S2 radially aligned with the first annular ring segment 62S1, extending partially circumferentially about the central axis 11, and circumferentially offset from the first annular ring segment 62S1.

In this configuration, the first and second annular ring segments 62S1, 62S2 can be configured to independently rotate about the central axis 11 so as to move each actuation arm 74 coupled thereto generally circumferentially relative to the first actuation head 76, or in other words, to pivot each actuation arm 74 coupled thereto about the actuation head 76 central axis 76C. The first and second annular ring segments 62S1, 62S2 are circumferentially spaced apart a great enough distance to allow maximum movement relative to each other. For example, in some scenarios, the first annular ring segment 62S1 may be moved in an opposing circumferential direction to the second annular ring segment 62S2 such that the respective tip segments 32 of their associated vanes 30 are rotated in opposing rotational directions.

The outlet guide vane assembly 28 can include multiple annular ring segments similar to the segments 62S1, 62S2 disposed around the entire circumferential extent of the assembly 28. As such, the multiple annular ring segments can define groups of vanes 30, the tip and hub segments 32, 42 of each being able to be rotated to unique pitch angles based on the circumferential movement and position of their respective annular ring segment. As will be described in detail below, the annular ring segments 62 may be controlled by a control system 99.

In some embodiments, the control system 99 is configured to rotate each segment 32, 42 of each vane 30 of the first plurality of variable leading edge outlet guide vanes 30 individually relative to each other vane's 30 segments 32, 42, as shown in FIG. 6. That is to say, each segment 32, 42 of each vane 30 may be rotated without moving any of the other vanes' segments 32, 42 of the first and second plurality of variable leading edge outlet guide vanes 30. This allows for the vanes 30 to be controlled in a variety of configurations. For example, a group of the plurality of variable leading edge outlet guide vanes 30 may be controlled to be rotated in unison and rotated to a first pitch angle, while other vanes 30 are individually controlled, each to unique pitch angles. The individual controllability of the vanes 30 accounts for variations in the fan exit air 15 around the circumference of the area of the plurality of variable leading edge outlet guide vanes 30, which is particularly beneficial for the reasons discussed above.

In another example, if the rotation of the first plurality of guide vanes 30 causes more undesirable flow effects in certain circumferential sectors, only vanes 30 located in those certain circumferential sectors may be rotated to specific pitch angles to reduce losses from said flow effects, while other vanes 30 may be rotated to different pitch angles. Then, if the flow dynamically encounters different distortions during operation, different circumferential sectors may require vane 30 adjustment. The individual controllability allows for the option to adjust these different circumferential sectors dynamically.

In order to carry out the individual control, the second end 74B of the actuation arm 74 may include a control member 75 coupled to an external actuator (not shown) that moves the actuation arm 74 generally circumferentially relative to the first actuation head 76, as shown in FIG. 5C. In other embodiments, the first actuation head 76 may be individually actuated via an actuator coupled directly to the actuation head 76, for example an actuator coupled to a radially outer side of the first actuation head 76.

As touched on above, by controlling at least one vane 30 of the plurality of variable leading edge outlet guide vanes 30, the control system 99 is configured to control at least some of the flow of the fan exit air 15 after it passes over and exits the fan blades 22. By controlling the entirety of the plurality of variable leading edge outlet guide vanes 30, the control system 99 can accommodate the overall flow of the fan exit air 15, in particular distorted flow, after it passes over and exits the fan blades 22 in order to control fan blade 22 response to forces acting on the fan blades 22, as well as to reduce losses created by undesirable variations in the air flow. Moreover, because the fan exit air 15 may not be uniform as it exits the fan blades 22, the plurality of variable leading edge outlet guide vanes 30 or the axial passage between the vanes 30 and the fan blades 22 operate further from their ideal design conditions. By adjusting the plurality of variable leading edge outlet guide vanes 30, parameters such as incidence are improved, and detrimental flow conditions and losses in the vanes 30 or the axial passage between the vanes 30 and the fan blades 22 such as vortices and stall are reduced.

In some embodiments, the control system 99 is configured to rotate the segments 32, 42 of each vane 30 of the first plurality of variable leading edge outlet guide vanes 30 to a first vane-pitch angle in response to the gas turbine engine 10 operating at a given operating condition so as to reduce the incidence between the outlet guide vane assembly 28 and the fan exit air 15 received from the plurality of fan blades 22 and redirect the fan exit air 15 in a first direction, in particular a generally axial direction. In particular, the operating condition in which the fan assembly 12 and gas turbine engine 10 are operating in may include at least one of take-off, climb, cruise, landing, and aircraft maneuvers of an aircraft having the engine 10 equipped. In each of these operating conditions, the plurality of fan blades 22 and/or the vanes 30 of the fan assembly 12 may experience various undesirable operability issues such as forcing, stall, and flutter. For example, the engine 10 may operate in particular speed ranges for each of the operating conditions, and as result, the fan blades 22 may experience greater or lower levels of forcing, stall, and/or flutter in response to the engine 10 operating in particular speed ranges.

In order to compensate for these forces acting on the fan blades 22, the control system 99 is configured to rotate the segments 32, 42 of the first plurality of variable leading edge outlet guide vanes 30 to an arrangement of first vane-pitch angles in order to alter the angle of the flow of fan exit air 15 after it exits the fan blades 22. This change in the angle of flow as the fan exit air 15 passes over the first plurality of variable leading edge outlet guide vanes 30 reduces the amount of forcing, stall, and/or flutter experienced by the fan blades 22 and/or the outlet guide vanes 30. Moreover, the control system 99 is configured to reset a desired incidence of air flow into the first plurality of variable leading edge outlet guide vanes 30 in response to swirl in the inlet flow. This produces an averaging effect that improves engine performance and efficiency. These arrangements of the vanes 30 can also recover the losses created by flow separation, flow distortions, vortices, and/or swirl.

The control system 99 is operable to control the segments 32, 42 of the first plurality of variable leading edge outlet guide vanes 30 in a variety of configurations and arrangements in order to compensate for inlet pressure distortion, vortices and swirl, thus reducing the forcing, stall, flutter, flow separation, and any other undesirable effects in the fan rotor or outlet vanes. For example, in some embodiments, the control system 99 is configured to rotate the segments 32, 42 of each vane 30 of the first plurality of guide vanes 30 in unison. In other words, all of the first plurality of guide vanes 30 move to the same first vane-pitch angle. In such embodiments, each vane 30 may be mechanically connected to each other via the first and second annular rings 62, 64.

In some embodiments, the control system 99 is configured to rotate at least two different groups of variable leading edge outlet guide vanes 30. For example, the control system 99 may be configured to selectively rotate the segments 32, 42 of each group of vanes 30 to create non-uniform back-pressure that drives the fan inlet distortion flows within the fan to change or redistribute around the circumference of the fan. This locally reduces loading on fan blades 22 within a lip separated flow with low local pressure to reduce forcing and/or improve the uniformity of flow in general through the fan to reduce forcing. In particular, fully opening (allowing full flow through the guide vanes) at least one group of vanes 30 and fully closing at least one further group of vanes 30 (allowing no flow through the guide vanes) reduces a tendency for a local stall of the fan blades 22 that could lead to early overall stall in the fan. In some embodiments, the control system 99 is configured to rotate a large group of vanes 30 which counters bulk swirling flows or local changes to improve localized intake swirl gradients to improve fan performance and operability.

In at least one additional embodiment, the segments 32, 42 of the plurality of variable leading edge outlet guide vane 30 are broken into unique groups of vanes 30, as shown in FIG. 5B. Each group of vanes 30 is mechanically connected to each other, or ganged, via a unique circumferentially extending annular ring segment, such as the annular ring segments 62S1, 62S2 shown in FIG. 5B. Although the illustrative embodiment shows each group of vanes 30 including two vanes 30, the vanes 30 may be grouped and ganged in any combination of at least two groups of vanes totaling at least one fewer vane than the total number of vanes 30 in the plurality of outlet guide vanes 30. For example, if the first plurality of outlet guide vanes 30 includes 60 vanes, a first group may include 30 vanes and a second group may include 30 vanes. As a further non-limiting example, a first group of vanes may include 50 vanes, a second group of vanes may include five vanes, and a third group of vanes may include five vanes.

In some embodiments, the segments 32, 42 of the first plurality of variable leading edge outlet guide vanes 30 includes a first group of first vanes 30 and a second group of the segments 32, 42 of first vanes 30 different from the first group of guide vanes 30. The control system 99 is configured to rotate the first group of first vanes 30 to a first vane-pitch angle and the second group of first vanes 30 to a second vane-pitch angle that is different from the first vane-pitch angle. The groups of vanes 30 may be individually controlled or each group may be ganged together. For example, in some embodiments, one half of the first plurality of outlet guide vanes 30 is the first group and the other half of the first plurality of outlet guide vanes 30 is the second group.

In some embodiments, the control system 99 utilizes predetermined arrangements of the plurality of variable leading edge outlet guide vanes 30 that are based on predetermined measurements and data taken in predetermined engine operating conditions and predetermined airflow characteristics. As such, the control system 99 is configured to rotate the vanes 30 to specific predetermined arrangements based on the operating condition and/or airflow characteristic(s) of the fan exit air 15 or the inlet air that the engine 10 and fan assembly 12 are operating in, or based on projected operating conditions and/or airflow characteristic (s) that will be encountered by the engine 10 during a mission.

In some embodiments, the predetermined arrangements of the segments 32, 42 of the plurality of variable leading edge outlet guide vanes 30 can be based on previously acquired test data corresponding to specific flight conditions. In a more complex arrangement, the control system 99 could be coupled to measurement systems, such as the at least one sensor 92 described below, that detect flow instabilities associated with impending fan stall to direct vane geometry changes to extend margins. The control system 99 may be more effective near stall as the vanes 30 can redistribute flow conditions to minimize local stall cells. Having smaller ganged vane 30 groups are efficient as well in that such groups only reduce losses locally to extend operability and performance.

In some embodiments, the control system 99 includes at least one sensor 92 configured to take real-time measurements of the air flow within the fan duct passage 24 and of forces acting on the fan assembly components, as shown in FIG. 2. The real-time measurements may be utilized in order to determine the operating condition and/or airflow characteristic(s) of the fan exit air 15 or the inlet air that the engine 10 and fan assembly 12 are operating in so as to inform the control system 99 to which predetermined arrangement to rotate the plurality of variable leading edge outlet guide vanes 30.

In some embodiments, the control system 99 includes a neural network configured to perform machine learning such that the control system 99 can iterate over the predetermined arrangements in order to calculate new arrangements that are applicable to new variations in the operating condition and/or airflow characteristics that are unaccounted for by the predetermined settings and arrangements.

In some embodiments, the control system 99 further includes a subsystem control that is integrated with other engine controls to further control reduction of losses created by undesirable variations in the air flow and improve engine performance and efficiency. For example, if rotation of vanes 30 resulted in a fan flow drop, the subsystem control is configured to compensate for this by increasing the fan speed in order to maintain thrust, and/or by changing the exhaust area of the engine 10 in order to further reduce the losses and improve engine efficiency.

In some embodiments, the at least one sensor 92 may be located proximate to the fan blades 22, proximate to the plurality of variable leading edge outlet guide vanes 30, or both, as shown in FIG. 2. In some embodiments, the sensor or sensors 92 are located in the outer casing 19 radially outward of the fan blades 22 and vanes 30. The at least one sensor 92 may include one of or a combination of dynamic sensors, static wall pressure sensors, altitude sensors, sensors configured to detect the angle of attack of the plurality of fan blades 22, sensors configured to detect the tip timing of the plurality of fan blades 22, and airspeed sensors. In some embodiments, the sensor 92 may be a dynamic pressure transducer. The sensor 92 may also be a sensor configured to measure a rotational speed of the fan blades 22, which could be used along with an additional sensor that is a dynamic pressure transducer.

In the illustrative embodiment, the functionality of the control system 99 described herein may be implemented in various processing and computing devices, and may be located within the engine 10 or outside of the engine 10. Moreover, the functionality may be configured to operate on executable software provided on the processing and computing devices.

Furthermore, the functionality disclosed herein may be implemented in various configurations using computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Computer-executable instructions comprise, for example, instructions and data which cause a general purpose computer, special purpose computer, or special purpose processing device to perform a certain function or group of functions.

Figure 7:
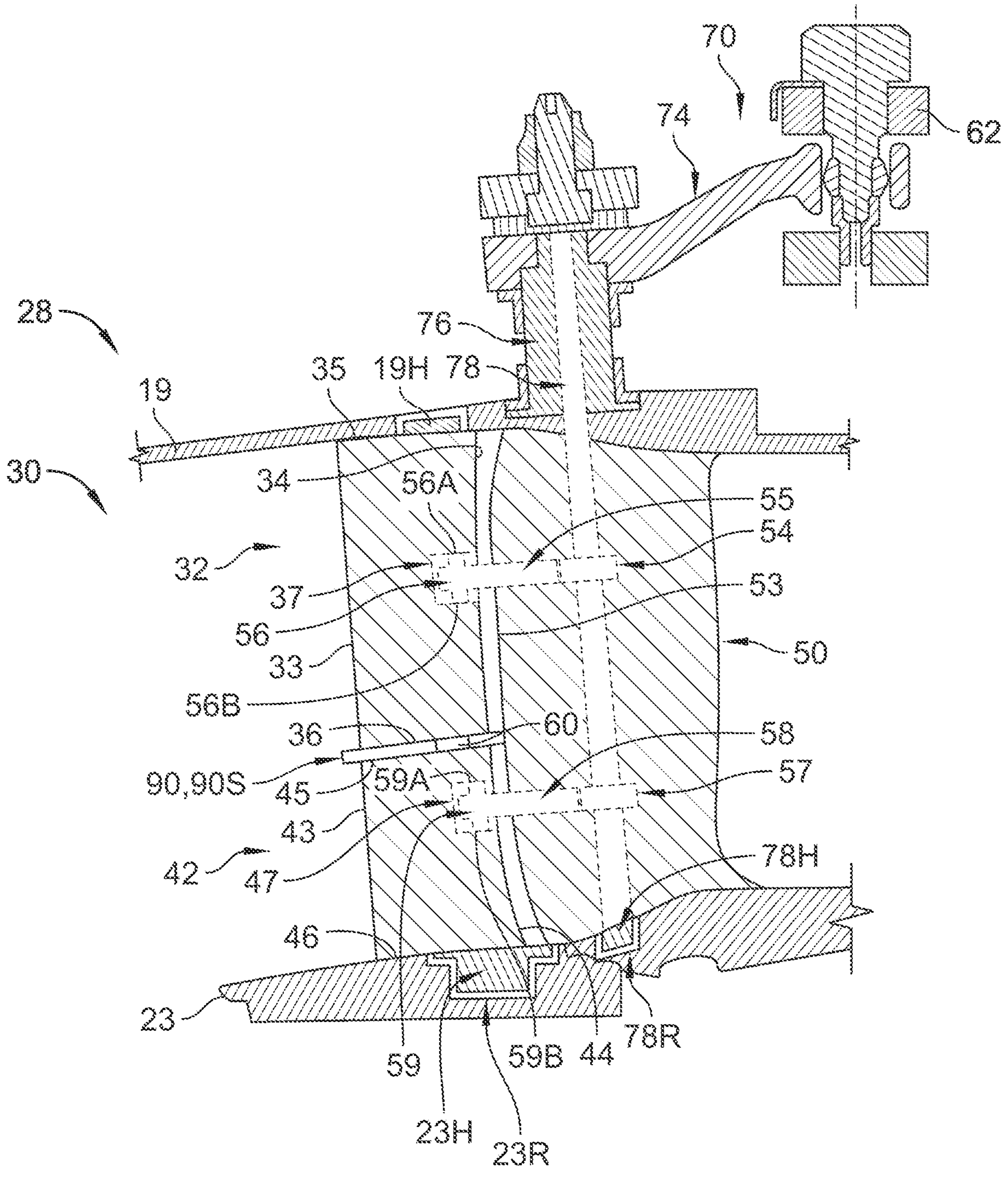
FIG. 7 is a side cross-sectional view of the outlet guide vane of FIG. 3, showing that the guide vane can further include a first air manipulating member arranged radially between the first tip segment and the first hub segment.

As shown in FIG. 7, an air manipulating member 90 may be arranged in the small radial gap between the first tip and hub segments 32, 42. In particular, in some embodiments, the air manipulating member 90 may be configured as a winglet 90 or platform coupled to an axially forward side 53 of the fixed aft portion 50. In other embodiments, the air manipulating member 90 may be configured as a seal 90S coupled to the axially forward side 53 of the fixed aft portion 50, or may be directly coupled to one of the sides 36, 45 of the tip and hub segments 32, 42.

Figure 8:
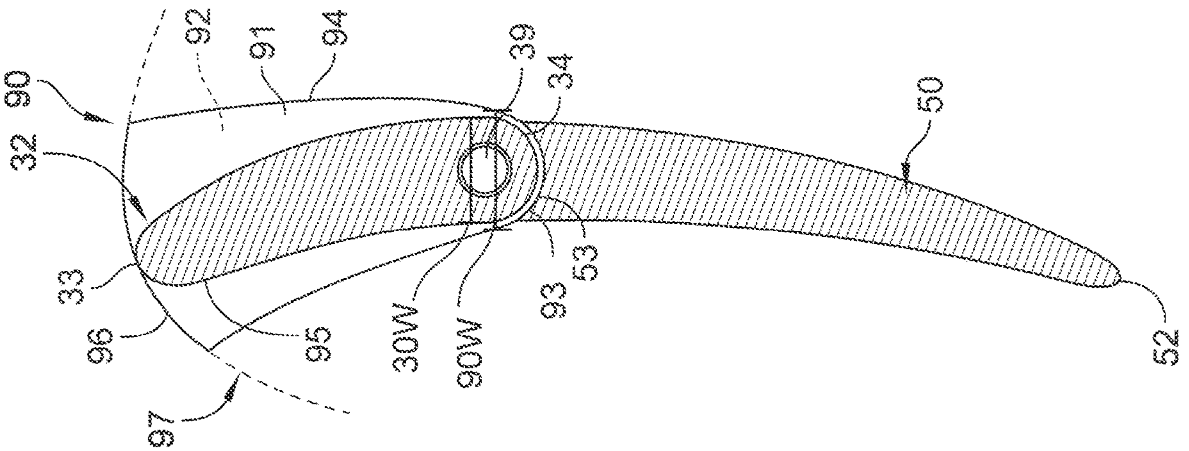
FIG. 8 is a top cross-sectional view of the outlet guide vane of FIG. 7, showing the first tip segment at a neutral position and a top view of the first air manipulating member configured as a winglet.
Figure 9:
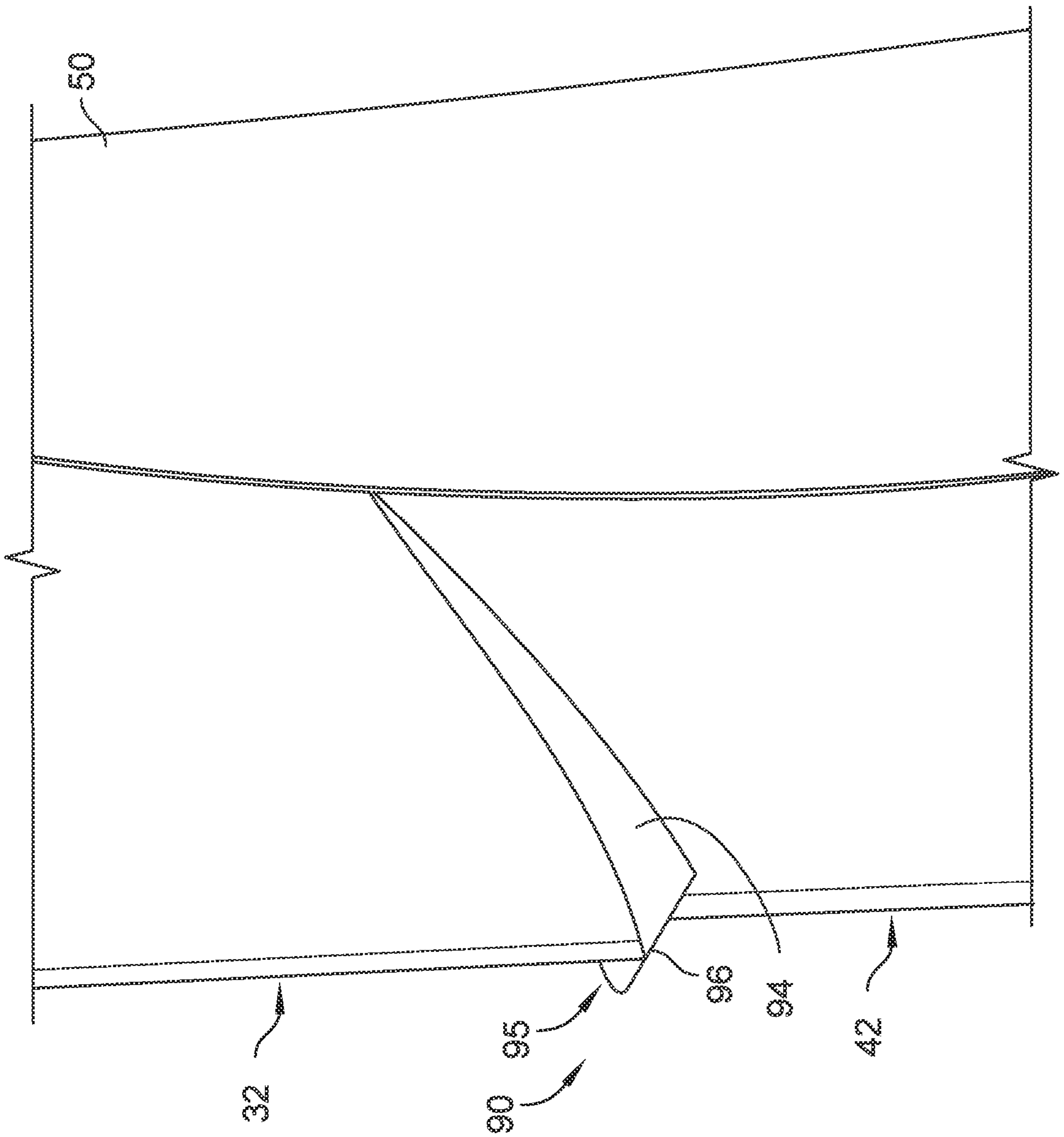
FIG. 9 is a perspective view of the outlet guide vane of FIG. 8, showing the first air manipulating member configured as a winglet.
Figure 10:
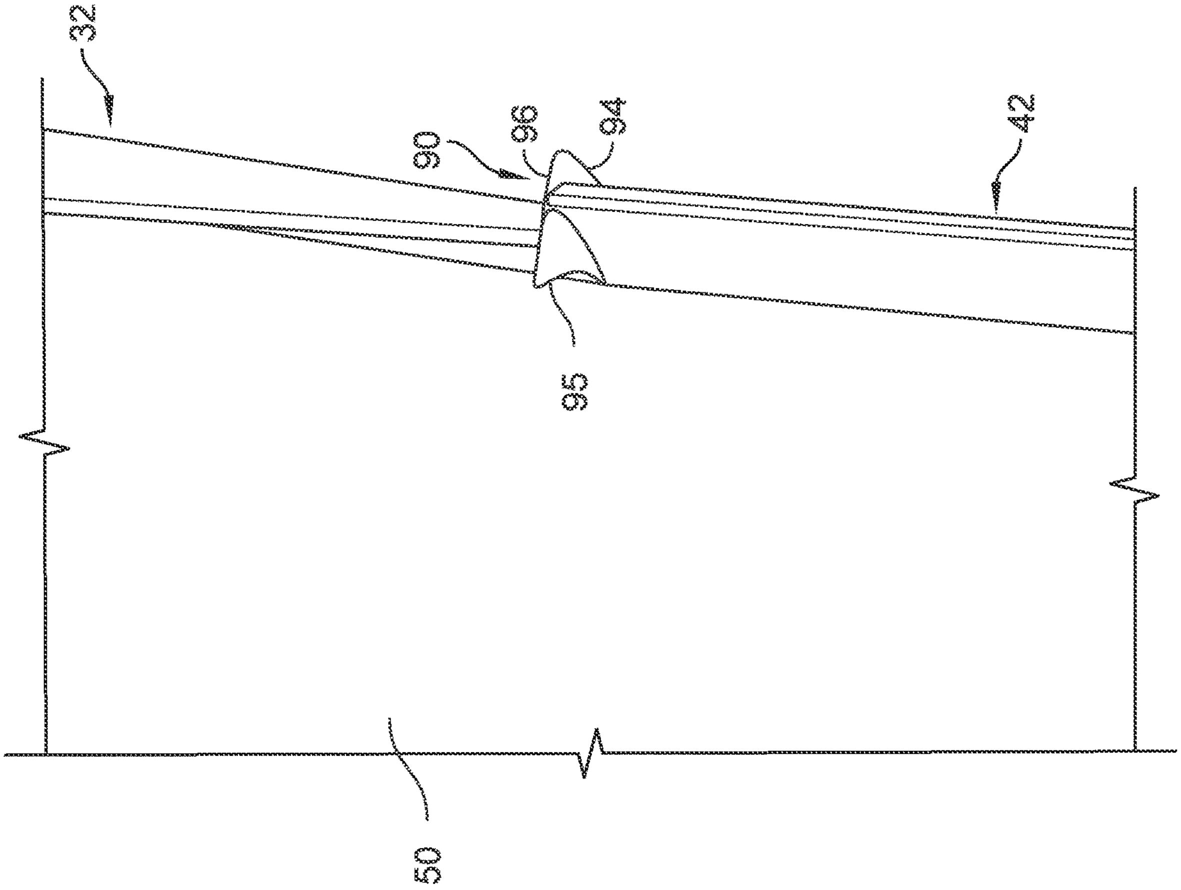
FIG. 10 is a perspective view of the outlet guide vane of FIG. 8, showing the first air manipulating member configured as a winglet.

As shown in FIGS. 8-10, the air manipulating member 90 may be configured as a winglet 90 that reduce radial flows across the tip and hub segments 32, 42. This is particularly helpful when the tip and hub segments 32, 42 are set to non-neutral, opposing pitch angles. As shown in FIG. 8, the winglet 90 may be generally planar and include a radially outer winglet surface 91 and a radially inner winglet surface 92, each surface generally facing radially. The winglet 90 further includes an axially aft end 93, a suction side edge 94, and a pressure side edge 95. The suction and pressure side edges 94, 95 may be curved similarly to the curvature of the airfoil shape of the vane 30.

The winglet 90 further includes a forward edge 96 that is curved. In some embodiments, the forward edge 96 is curved to match the rotational path, or path of movement, of the leading edge 33, 43 of the tip and hub segments 32, 42. In particular, the forward edge 96 may include a radius of curvature 97 that matches the rotational path of the tip and hub segments 32, 42, as shown in FIG. 8. In some embodiments, a width 90W of the winglet 90 is equal to or greater than a width 30W of the first tip segment 32 and the first hub segment 42 along an entire axial extent of the first tip segment 32 and the first hub segment 42. In some embodiments, the width of the winglet 90 at the axially aft end 93 is less than a length of the forward edge 96. In some embodiments, the winglet 90 has a radial height that allows for the seal to barely contact or nearly contact the sides 36, 45 of the tip and hub segments 32, 42 so as to prevent flow from entering this gap.

FIG. 9 and FIG. 10 show a side and front perspective view, respectively, of the winglet 90. In the example shown in FIG. 9, the tip segment 32 is moved to a first pitch angle, which is to the left of a neutral zero angle position when viewing FIG. 10 and FIG. 11. As can be seen, the forward edge 96 is long enough such that the pressure side edge 95 is located beyond the position of the tip segment 32 in the circumferential direction. In some embodiments, the forward edge 96 is formed to be long enough such that both the suction and pressure side edges 94, 95 are located outside of the potential range of pitch angle positions of the tip and hub segments 32, 42. This ensures that radial flows across the tip and hub segments 32, 42 will continue to be better matched at all pitch angle positions of the tip and hub segments 32, 42.

Figure 11:
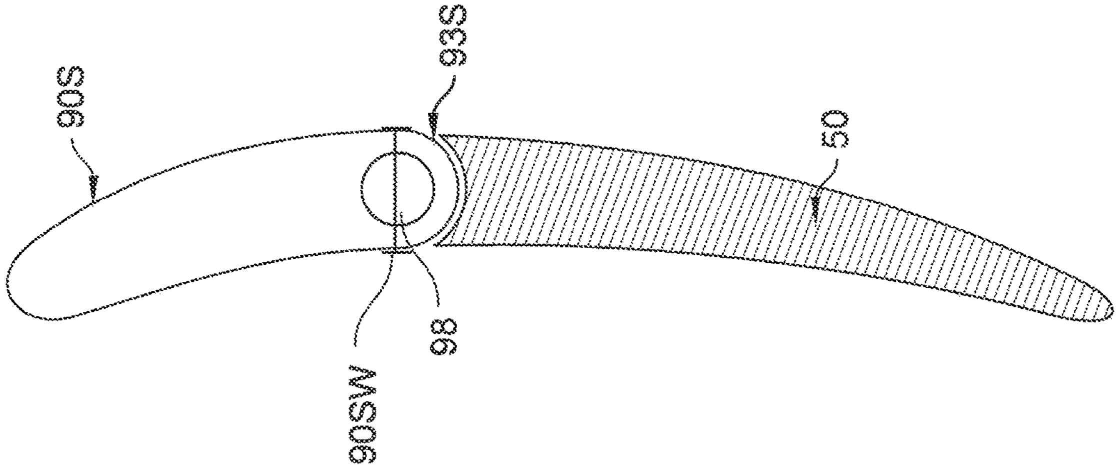
FIG. 11 is a top cross-sectional view of the outlet guide vane of FIG. 8, showing a top view of the first air manipulating member configured as a seal.

As can be seen in FIG. 11, the air manipulating member 90 may be configured as a seal 90S which is coupled to the axially forward side 53 of the fixed aft portion 50 at an axially aft end 93S of the seal 90S. The seal 90S may be generally planar. In some embodiments, the seal 90S has a radial height that allows for the seal to barely contact or nearly contact the sides 36, 45 of the tip and hub segments 32, 42 so as to seal the radial gap between the segments 32, 42 and prevent flow from entering this gap. In some embodiments, the seal 90S may be directly coupled to the radially inner side 36 of the tip segment 32. In some embodiments, the seal 90S may be directly coupled to the radially outer side 45 of the hub segment 42. In some embodiments, a width 90SW of the seal 90S is equal to or greater than a width 30W of the first tip segment 32 and the first hub segment 42 along an entire axial extent of the first tip segment 32 and the first hub segment 42. In some embodiments, the seal 90S may include a cutout 98 so as to allow a hinge rod 37 to pass therethrough. The winglet 90 may include a similar cutout 98. In other embodiments in which the segments 32, 42 do not include a hinge rod, the cutout 98 would not be necessary. In some embodiments, an outer perimeter of the seal 90S generally corresponds to an outer perimeter of each of the first tip segment 32 and the first hub segment 42, as shown in FIG. 11.

A person skilled in the art will understand that all features and components of all embodiments described herein, including the guide vane assembly 28 described above and the outlet guide vane assemblies described below can be interchanged and modified to include some elements of some embodiments and other elements of other embodiments. For example, even though some embodiments are shown without a static central segment, these embodiments may include such a central segment, as described herein. Similarly, although some embodiments described two tip segments and two hub segments, some embodiments can include one tip and two hub segments, two tip and one hub segments, each with or without a static central hub section, or other combinations thereof. Similarly, the actuation assemblies can be interchanged, with some embodiments and configurations including pass-through actuation assemblies, two assemblies arranged at the tip and hub, different configurations of segmented and full annular rings, and the like.

Figure 12:
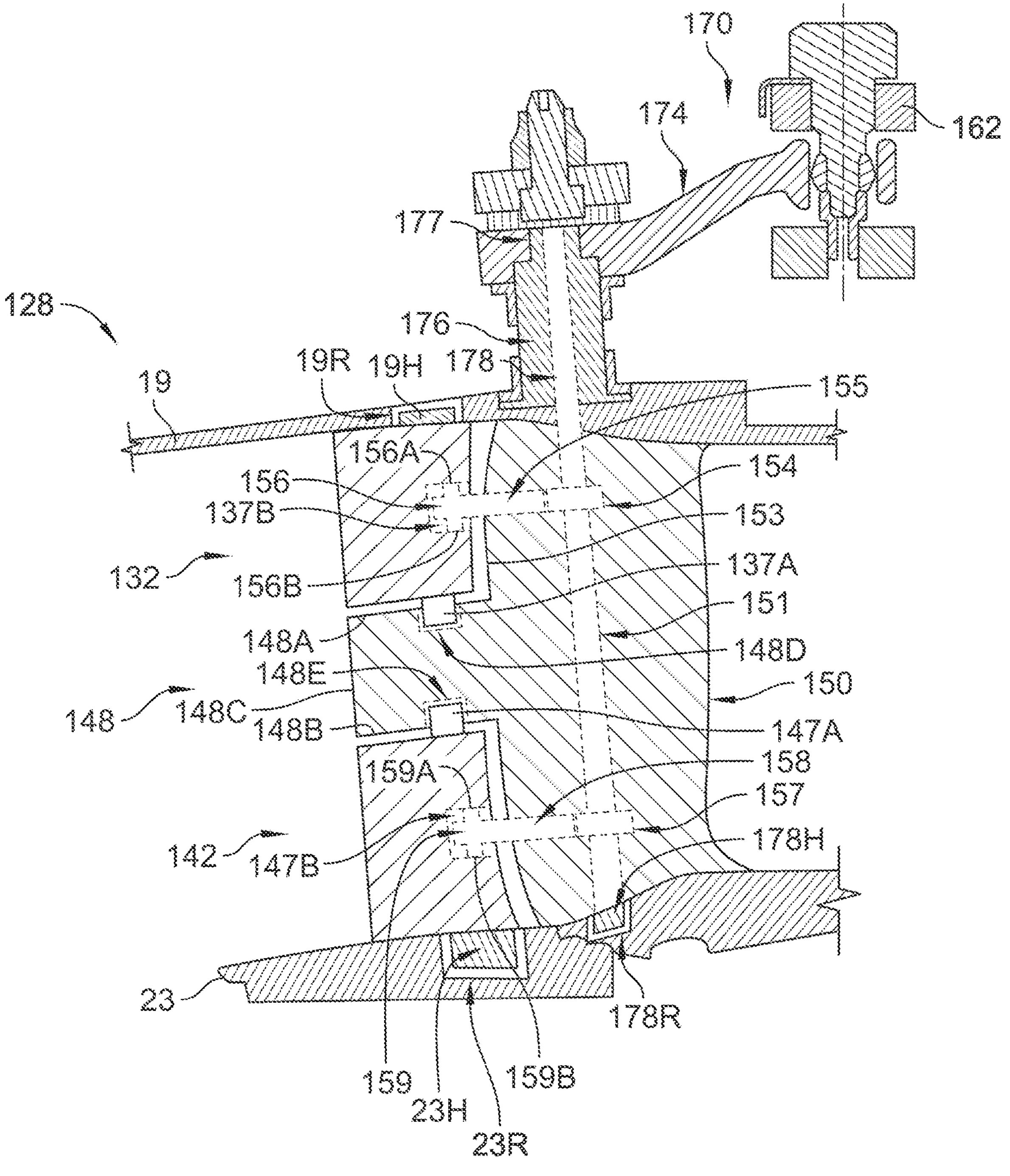
FIG. 12 is a side cross-sectional view of a first variable leading edge outlet guide vane according to a further aspect of the present disclosure, showing that the first variable leading edge outlet guide vane includes the first tip segment and the first hub segment, showing that the outlet guide vane assembly includes a first actuation assembly arranged radially outward of the aft fixed portion and including a cam rod with two cams attached thereto and associated with the first tip and hub segments, rotation of the cam rod causing rotation of the cams which causes rotation of the first tip and hub segments, and showing that the guide vane further includes a static central portion arranged radially between the first tip segment and the first hub segment.

Another embodiment of an outlet guide vane assembly 128 is shown in FIG. 12. The outlet guide vane assembly 128 is similar to the outlet guide vane assembly 28 shown in FIGS. 1-11 and described herein. Accordingly, similar reference numbers in the 100 series indicate features that are common between the outlet guide vane assembly 128 and the outlet guide vane assembly 28. The description of the outlet guide vane assembly 28 is incorporated by reference to apply to the outlet guide vane assembly 128, except in instances when they conflict with the specific description and the drawings of the outlet guide vane assembly 128.

Similar to the outlet guide vane assembly 28 described above, the outlet guide vane assembly 128 includes first tip and hub segments 132, 142. In this embodiment, the first variable leading edge outlet guide vane 130 further includes a central segment 148 arranged between the first tip segment 132 and the first hub segment 142 such that the first tip segment 132 and the first hub segment 142 are radially spaced apart. In some embodiments, the central segment may be coupled to and extend axially away from the axially forward side 153 of the fixed aft portion 150. The central segment 148 is static and does not rotate.

As can be seen in FIG. 12, the central segment 148 includes a radially outer side 148A, a radially inner side 148B, and an axially forward end 148C extending between the radially outer and inner sides 148A, 148B and partially defining the leading edge of the vane 130 along with the tip and hub segments 132, 142. The central segment 148 may further include a radially outer hinge rod receiving cavity 148D configured to receive a hinge rod 137A of the tip segment 132, and a radially inner hinge rod receiving cavity 148E configured to receive a hinge rod 147A of hub segment 142. The central segment 148 may provide stability to the tip and hub segments 132, 142, as well as allow for uninterrupted flow over the central portion of the vane 130. The first tip and hub segments 132, 142 further include actuation rod receiving recesses 137B, 147B formed therein in that receive the actuation rods 155, 158, similar to the actuation rods 55, 58 described above.

In some embodiments, the outlet guide vane assembly 128 may include a single or multiple air manipulating members 190A, 190B arranged in the small radial gaps between the tip segment 132 and central segment 148 and between the hub segment 142 and central segment 148. The air manipulating members 190A, 190B may be formed similarly to the air manipulating member 90 described above, in particular formed as seals or winglets.

In some embodiments, one of the air manipulating members 190A, 190B may be formed as a winglet while the other is formed as a seal. In some embodiments, both of the air manipulating members 190A, 190B are formed as a seal. In some embodiments, both of the air manipulating members 190A, 190B are formed as a winglet. In embodiments in which the tip and hub segments 132, 142 are rotationally attached to the central segment 148 via hinge rods similar to those described above, the air manipulating members 190A, 190B can include a cutout (not shown but similar to the cutout 98) to allow the hinge rods to pass therethrough. In other arrangements in which the tip and hub segments 132, 142 are entirely spaced apart from the central segment 148, the cutout would not be necessary.

Figure 13:
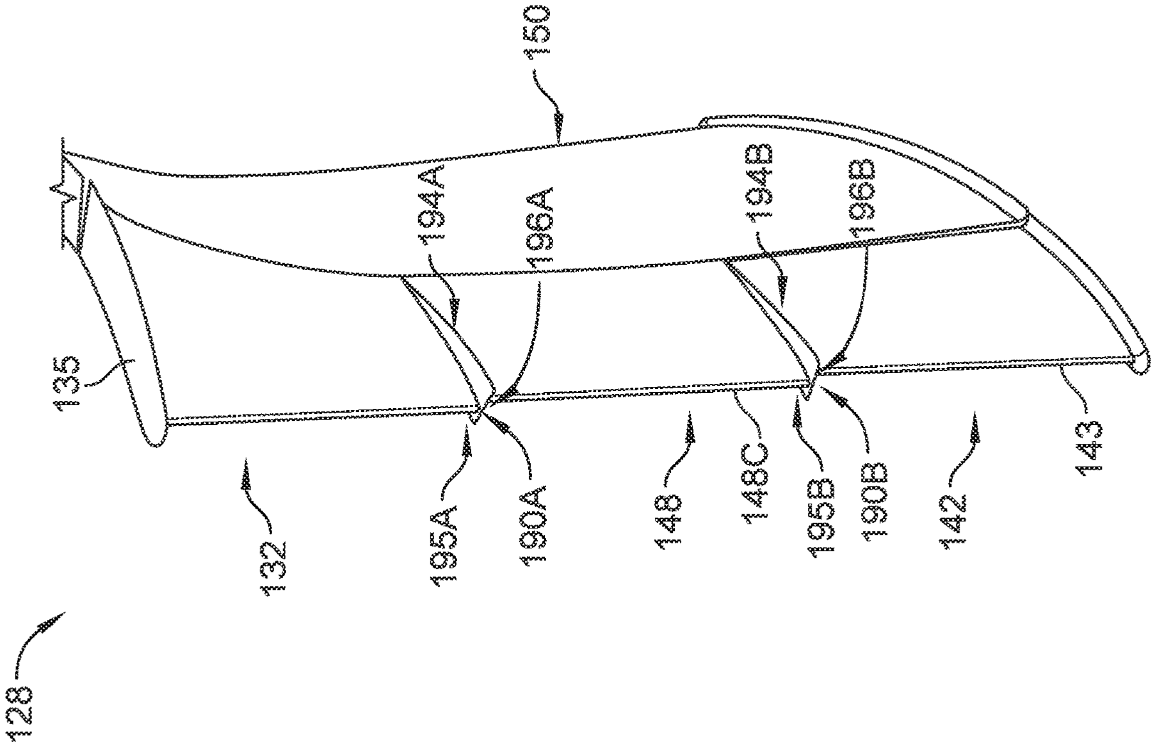
FIG. 13 is a perspective view of the outlet guide vane of FIG. 12, showing that air manipulating members configured as a winglets can be arranged between the first tip and hub segments and the static central portion.

As can be seen in FIG. 13, the forward edge 196A of the winglet 190A is long enough such that the pressure side edge 195A is located beyond the position of the tip segment 132 in the circumferential direction. Similarly, the forward edge 196B of the winglet 190B is long enough such that the suction side edge 194B is located beyond the position of the hub segment 142 in the circumferential direction. In some embodiments, the forward edges 196A, 196B are formed to be long enough such that both the suction and pressure side edges 194A, 194B, 195A, 195B are located outside of the potential range of pitch angle positions of the tip and hub segments 132, 142. This ensures that radial flows across the tip and hub segments 132, 142 will continue to be better matched at all pitch angle positions of the tip and hub segments 132, 142.

Figure 14:
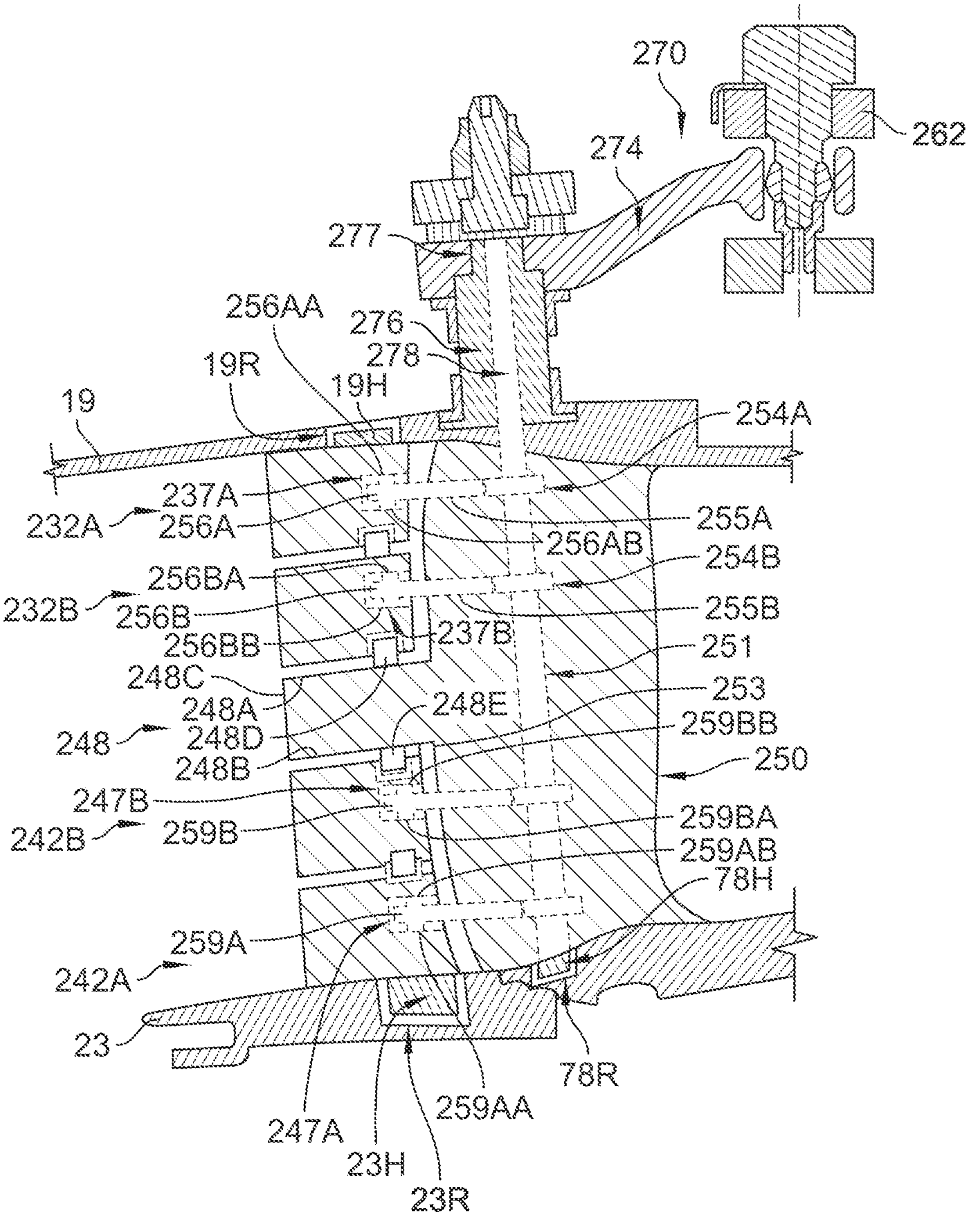
FIG. 14 is a side cross-sectional view of a first variable leading edge outlet guide vane according to a further aspect of the present disclosure, showing that the first variable leading edge outlet guide vane includes first and second tip segments and first and second hub segments, showing that the outlet guide vane assembly includes a first actuation assembly arranged radially outward of the aft fixed portion and including a cam rod with four cams attached thereto and associated with the first and second tip and hub segments, rotation of the cam rod causing rotation of the cams which causes rotation of the respective tip and hub segments, and showing that the guide vane further includes a static central portion arranged radially between the first tip segment and the first hub segment.
Figure 15:
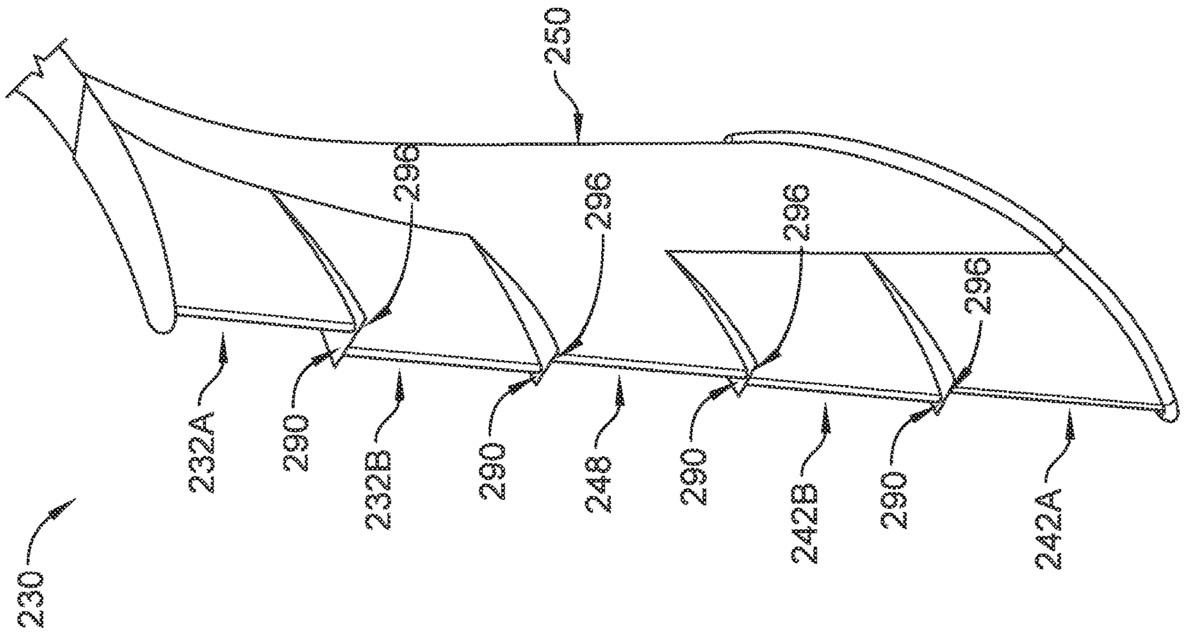
FIG. 15 is a perspective view of the outlet guide vane of FIG. 14, showing that air manipulating members configured as a winglets can be arranged between the first and second tip and hub segments and the static central portion.

Another embodiment of an outlet guide vane assembly 228 is shown in FIG. 14 and FIG. 15. The outlet guide vane assembly 228 is similar to the outlet guide vane assemblies 28, 128 shown in FIGS. 1-13 and described herein. Accordingly, similar reference numbers in the 200 series indicate features that are common between the outlet guide vane assembly 228 and the outlet guide vane assemblies 28, 128. The descriptions of the outlet guide vane assemblies 28, 128 are incorporated by reference to apply to the outlet guide vane assembly 228, except in instances when they conflict with the specific description and the drawings of the outlet guide vane assembly 228.

Similar to the outlet guide vane assemblies 28, 128 described above, the outlet guide vane assembly 228 includes first tip and hub segments 232A, 242A and a central segment 248. Unlike the assemblies described above, the outlet guide vane assembly 228 further includes a second tip segment 232B and a second hub segment 242B arranged radially between the first tip segment 232A and the central segment 248 and between the first hub segment 242A and the central segment 248, respectively. The additional second tip segment 232B and second hub segment 242B allow for additional variations of the fan exit air 15 flowing over the vane 230. In some embodiments, the central segment 248 may not be included such that the vane 230 only includes the four segments 232A, 232B, 242A, 242B.

In order to move all four segments 232A, 232B, 242A, 242B, the assembly 228 includes a first actuation assembly 270 configured substantially similarly to the actuation assemblies 70, 170. Specifically, instead of two cams arranged on the cam rod 278, such as the cams 54, 57 described above, the first actuation assembly 270 includes four cams 254A, 254B, 257A, 257B each associated with a respective segment 232A, 232B, 242A, 242B, as shown in FIG. 14. Each segment 232A, 232B, 242A, 242B includes a respective cam actuation rod 255A, 255B, 258A, 258B rotatably extending therefrom and configured to engage with a respective cam 254A, 254B, 257A, 257B. Similar to the actuation assemblies 70, 170, the cams 254A, 254B, 257A, 257B may be selectively clocked such that rotation of the cam rod 278 can cause the segments 232A, 232B, 242A, 242B to move to the same or differing pitch angles. In some embodiments, the segments 232A, 232B, 242A, 242B are rotatably hinged to each other via the same hinge and hinge receiving cavity arrangements as those described above with regard to the outlet guide vane assembly 128.

Similar to the outlet guide vane assembly 128, in some embodiments, the outlet guide vane assembly 228 may include a single or multiple air manipulating members 290 arranged in the small radial gaps between the segment 232A, 232B, 242A, 242B and central segment 248. The air manipulating members 290 may be formed similarly to the air manipulating member 90, 90S, 190, 190S described above, in particular formed as seals or winglets.

In some embodiments, one of the air manipulating members 290 may be formed as a winglet while the others are formed as seals. In some embodiments, one of the air manipulating members 290 may be formed as a seal while the others are formed as winglets. In some embodiments, two of the air manipulating members 290 may be formed as winglets while the others are formed as seals. In some embodiments, all of the air manipulating members 290 are formed as seals. In some embodiments, all of the air manipulating members 290 are formed as winglets.

As can be seen in FIG. 15, the forward edges 296 of the winglets 290 are long enough such that both the suction and pressure side edges are located outside of the potential range of pitch angle positions of the segments 232A, 232B, 242A, 242B. This ensures that radial flows across the segments 232A, 232B, 242A, 242B will continue to be better matched at all pitch angle positions of the segments 232A, 232B, 242A, 242B.

Figure 16:
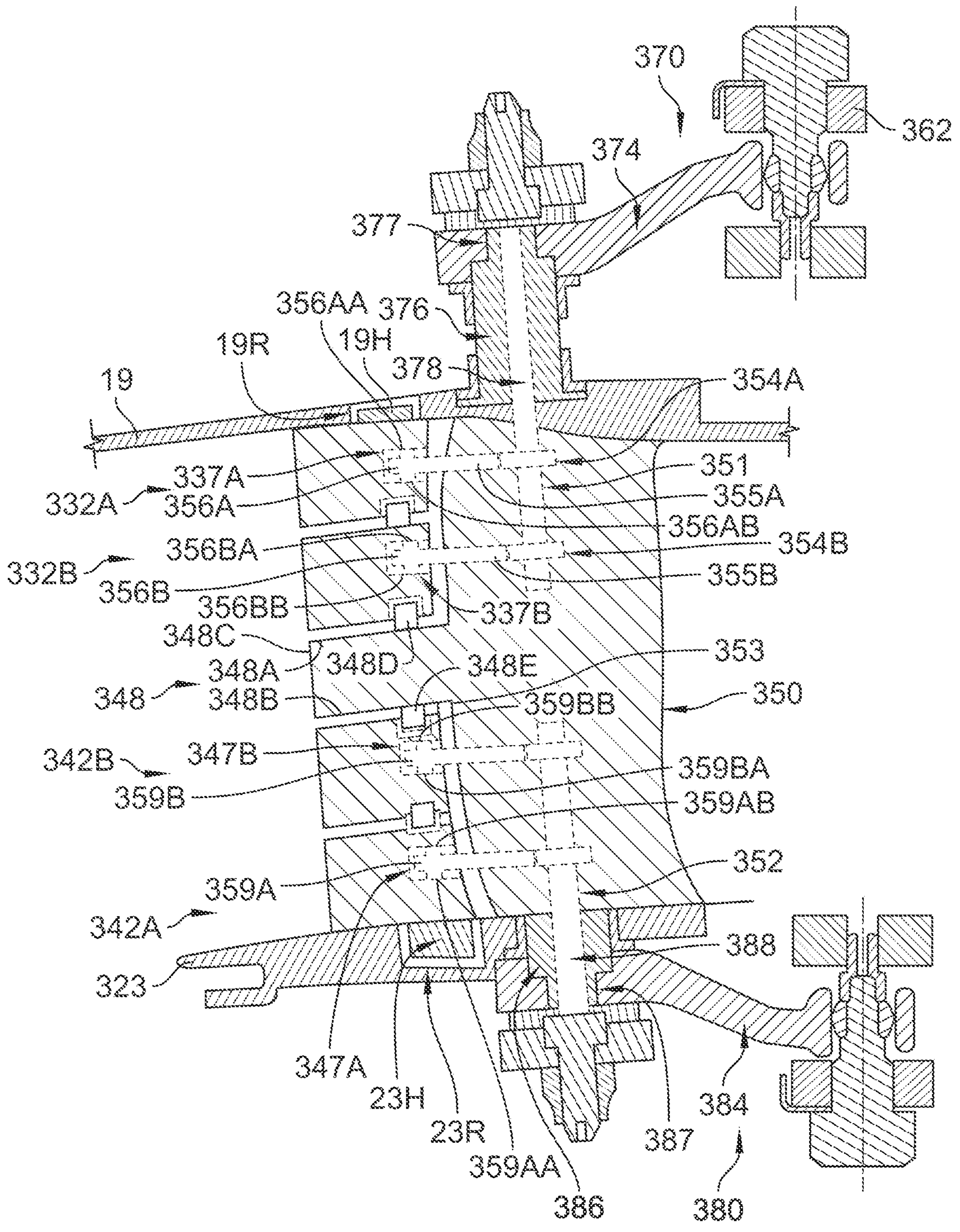
FIG. 16 is a side cross-sectional view of a first variable leading edge outlet guide vane according to a further aspect of the present disclosure, showing that the first variable leading edge outlet guide vane includes first and second tip segments and first and second hub segments, showing that the outlet guide vane assembly includes a first actuation assembly arranged radially outward of the aft fixed portion and including a cam rod with two cams attached thereto and associated with the first and second tip segments, showing that the outlet guide vane assembly includes a second actuation assembly arranged radially inward of the leading edge portion and including a cam rod with two cams attached thereto and associated with the first and second hub segments, and showing that the guide vane further includes a static central portion arranged radially between the first tip segment and the first hub segment.

Another embodiment of an outlet guide vane assembly 328 is shown in FIG. 16. The outlet guide vane assembly 328 is similar to the outlet guide vane assemblies 28, 128, 228 shown in FIGS. 1-15 and described herein. Accordingly, similar reference numbers in the 300 series indicate features that are common between the outlet guide vane assembly 328 and the outlet guide vane assemblies 28, 128, 128, 228. The descriptions of the outlet guide vane assemblies 28, 128, 228 are incorporated by reference to apply to the outlet guide vane assembly 328, except in instances when they conflict with the specific description and the drawings of the outlet guide vane assembly 328.

The outlet guide vane assembly 328 is similar to the outlet guide vane assemblies 28, 128 described above, in particular including first tip and hub segments 332, 342 that are rotated via actuation by cam mechanisms. Unlike the outlet guide vane assemblies 28, 128, the assembly 328 does not include a single cam rod, but instead includes two actuation assemblies 370, 380 each having its own unique cam rod 378, 388. The first actuation assembly 370 is configured to rotate the first tip segment 332, and the second actuation assembly 380 is configured to rotate the first hub segment 342.

As can be seen in FIG. 16, the first actuation assembly 370 includes a first actuation arm 374, a first actuation head 376 coupled to the first actuation arm 374, the first cam rod 378, and a first cam 354 fixedly coupled to the first cam rod 378. Similar to the first actuation arm 74, first actuation head 76, first cam rod 78, and first cam 54 described above, the first cam rod 378 is configured to be selectively rotated by pivoting movement of the actuation arm 374, and thus rotation of the actuation head 376, about the central axis of the cam rod 378 so as to selectively rotate the first cam 354. Rotation of the first cam 354 causes rotation of the first tip segment 332 about the leading edge pitch axis 339 to a first pitch angle relative to the incoming fan exit air 15.

The components of the first actuation assembly 370, including the first actuation arm 374, the first actuation head 376, the first cam rod 378, and the first cam 354, may be arranged similarly to the first actuation arm 74, first actuation head 76, first cam rod 78, and first cam 54 described above. In particular, the first actuation assembly 370 is arranged radially outward of the fixed aft portion 350 such that the first actuation head 376 is arranged at least partially within the fan duct outer casing 19. The first actuation assembly 370 further includes a first cam actuation rod 355 rotatably coupled to the first tip segment 332 and extending axially aft therefrom toward the first cam 354.

An axially aft end of the first cam actuation rod 355 engages an axially forward facing surface 354C of the first cam 354 such that rotation the first cam 354 in a first rotational direction causes the axially forward facing surface 354C to move the first cam actuation rod 355 axially forward. The first cam actuation rod 355 is rotatably coupled to the first tip segment 332 at a point offset from the leading edge pitch axis 339 in a circumferential direction, such as within the first actuation rod receiving recess 337. As a result, axially forward movement of the first cam actuation rod 355 rotates the first tip segment 332 in the first rotational direction.

As can be seen in FIG. 16, the second actuation assembly 380 is formed similarly to the first actuation assembly 380. In particular the second actuation assembly 380 includes a second actuation arm 384, a second actuation head 386 coupled to the second actuation arm 384, the second cam rod 388, and a second cam 357 fixedly coupled to the second cam rod 388. The second cam rod can be radially spaced apart from the first cam rod 378 by a distance, such as the distance shown in FIG. 16, or can be located proximate to the first cam rod 378, nearly touching the cam rod 378.

Similar to the first cam rod 378, the second cam rod 388 is configured to be selectively rotated by pivoting movement of the actuation arm 384, and thus rotation of the actuation head 386, about the central axis of the cam rod 388 so as to selectively rotate the second cam 357. Rotation of the second cam 357 causes rotation of the first hub segment 342 about the leading edge pitch axis 339 to a second pitch angle relative to the incoming fan exit air 15. The second pitch angle can be the same or different than the first pitch angle.

The second actuation assembly 380 is arranged radially inward of the fixed aft portion 350 such that the second actuation head 386 is arranged at least partially within the inner wall 23. The second actuation assembly 380 further includes a second cam actuation rod 358 rotatably coupled to the first hub segment 342 and extending axially aft therefrom toward the second cam 357.

An axially aft end of the second cam actuation rod 358 engages an axially forward facing surface 357C of the second cam 357 such that rotation the second cam 357 in a first rotational direction causes the axially forward facing surface 357C to move the second cam actuation rod 358 axially forward. The second cam actuation rod 358 is rotatably coupled to the first hub segment 342 at a point offset from the leading edge pitch axis 339 in a circumferential direction, such as within the second actuation rod receiving recess 347. As a result, axially forward movement of the second cam actuation rod 358 rotates the first hub segment 342 in the first rotational direction.

The first and second cams 354, 357 are configured to be selectively clocked to unique rotational positions on the first and second cam rods 378, 388 such that rotation of the first cam 354 causes the first tip segment 332 to be rotated to a first pitch angle relative to the incoming fan exit air 15 and rotation of the second cam 357 causes the first hub segment 342 to be rotated to a second angle relative to the incoming fan exit air 15. Similar to the first actuation assembly 70, an annular ring 362, or annular ring segments or individually actuators, can be utilized to move the actuation arm 374, or actuation arms 374 when there are a plurality of outlet guide vanes 330, thus rotating the first tip segment 332.

Similar to the first actuation assembly 370, the second actuation assembly 380 can include a second annular ring 364, or annular ring segments or individually actuators arranged radially inward of the fan duct 24, as shown in FIG. 16. The second annular ring 364, ring segments, or individual actuators may be formed and configured similarly to the first annular ring 362, ring segments, or individual actuators described above. Circumferential movement of the second annular ring 364 moves the actuation arm 384, or actuation arms 384 when there are a plurality of outlet guide vanes 330, thus rotating the first hub segment 342. In some embodiments, the cam rods 378, 388 may be offset from the fixed aft portion 350 and extend along a side of the fixed aft portion 350, but in other embodiments, as shown in FIG. 16, cam rod receiving cavities 351, 352 may be formed in the fixed aft portion 350 though which the cam rods 378, 388 may extend.

Figure 17:
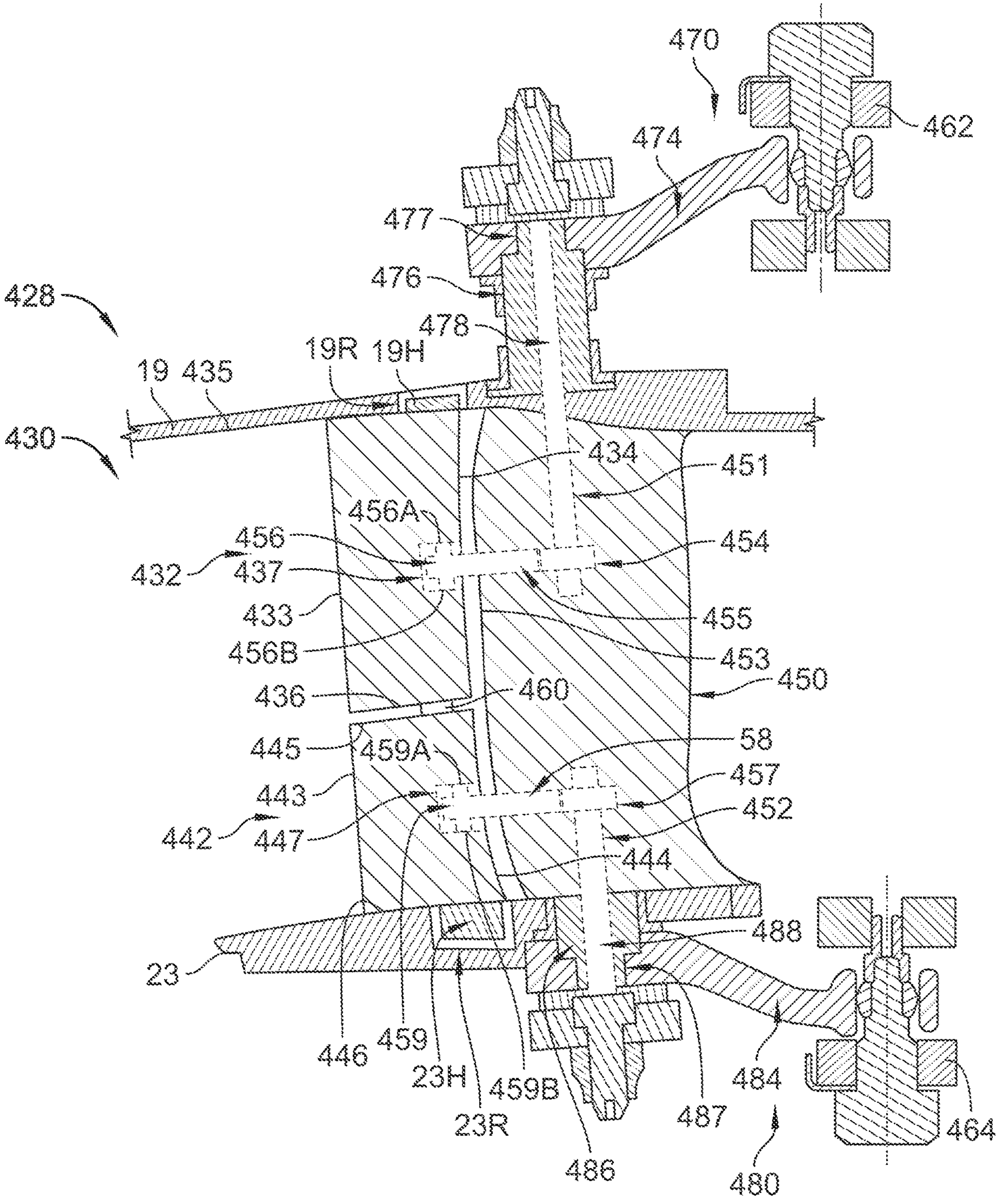
FIG. 17 is a side cross-sectional view of a first variable leading edge outlet guide vane according to a further aspect of the present disclosure, showing that the first variable leading edge outlet guide vane includes first tip and hub segments, showing that the outlet guide vane assembly includes a first actuation assembly arranged radially outward of the aft fixed portion and including a cam rod with a cams attached thereto and associated with the first tip segment, and showing that the outlet guide vane assembly includes a second actuation assembly arranged radially inward of the leading edge portion and including a cam rod with a cam attached thereto and associated with the first hub segment.

Another embodiment of an outlet guide vane assembly 428 is shown in FIG. 17. The outlet guide vane assembly 428 is similar to the outlet guide vane assemblies 28, 128, 228, 328 shown in FIGS. 1-16 and described herein. Accordingly, similar reference numbers in the 400 series indicate features that are common between the outlet guide vane assembly 428 and the outlet guide vane assemblies 28, 128, 128, 228, 328. The descriptions of the outlet guide vane assemblies 28, 128, 228, 328 are incorporated by reference to apply to the outlet guide vane assembly 428, except in instances when they conflict with the specific description and the drawings of the outlet guide vane assembly 428.

Similar to the outlet guide vane assembly 328 described above, the outlet guide vane assembly 428 includes first tip and hub segments 432, 442 and two actuation assemblies 470, 480 each associated with one of the first tip and hub segments 432, 442. The two actuation assemblies 470, 480 are formed similarly to the two actuation assemblies 370, 380 described above. Unlike the vane assembly 328 described above, the first variable leading edge outlet guide vane 430 further includes a central segment 448 arranged between the first tip segment 432 and the first hub segment 442 such that the first tip segment 432 and the first hub segment 442 are radially spaced apart. In some embodiments, the central segment 448 may be coupled to and extend axially away from the axially forward side 453 of the fixed aft portion 450. The central segment 448 is static and does not rotate.

As can be seen in FIG. 17, the central segment 448 includes a radially outer side 448A, a radially inner side 448B, and an axially forward end 448C extending between the radially outer and inner sides 448A, 448B and partially defining the leading edge of the vane 430 along with the tip and hub segments 432, 442. The central segment 448 may further include a radially outer hinge rod receiving cavity 448D configured to receive a hinge rod 437A of the tip segment 432, and a radially inner hinge rod receiving cavity 448E configured to receive a hinge rod 447A of hub segment 442. The central segment 448 may provide stability to the tip and hub segments 432, 442, as well as allow for uninterrupted flow over the central portion of the vane 430. The first tip and hub segments 432, 442 further include actuation rod receiving recesses 437B, 447B formed therein in that receive the actuation rods 455, 458, similar to the actuation rods 55, 58 described above.

Figure 18:
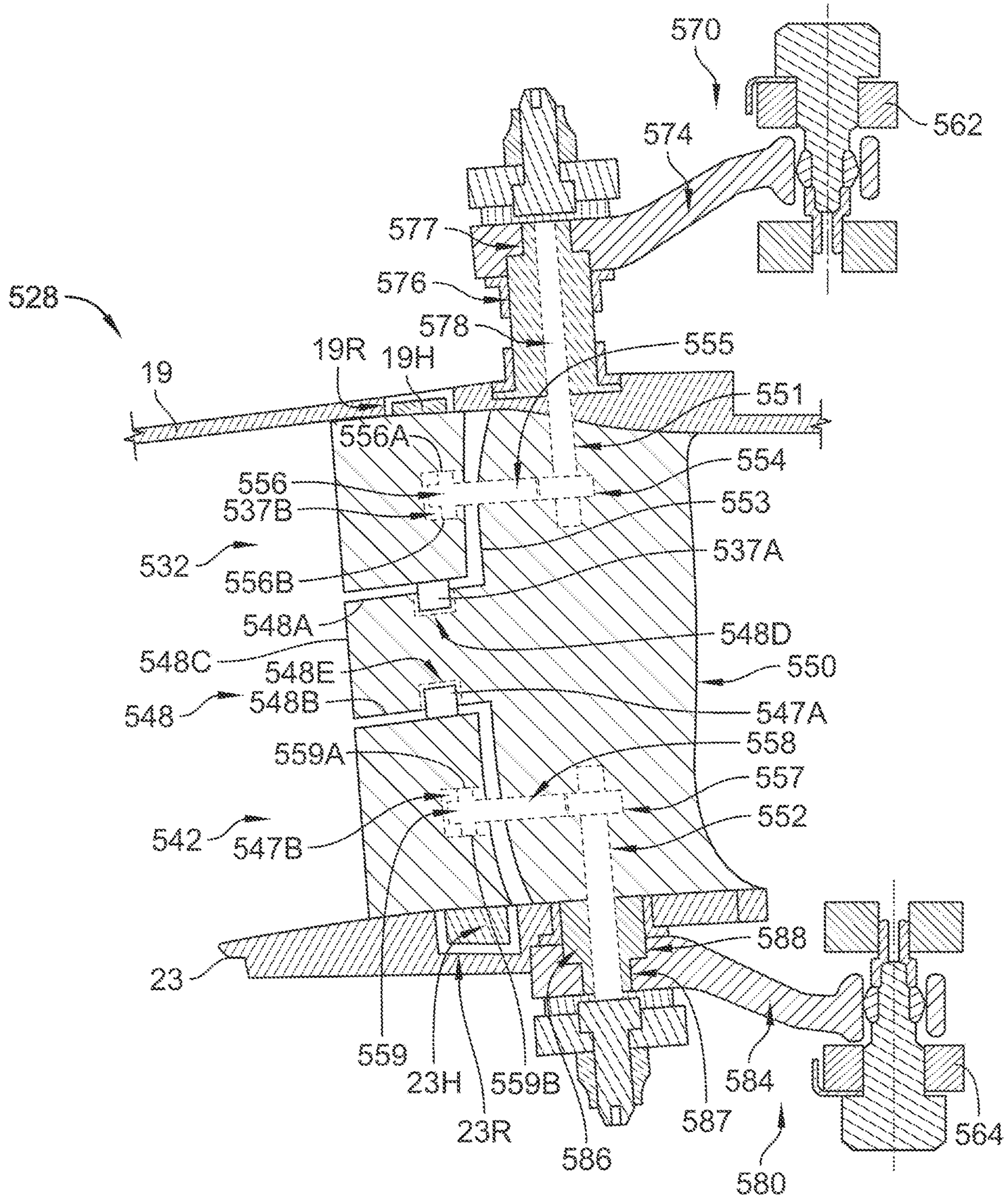
FIG. 18 is a side cross-sectional view of a first variable leading edge outlet guide vane according to a further aspect of the present disclosure, showing that the first variable leading edge outlet guide vane includes first tip and hub segments, showing that the outlet guide vane assembly includes a first actuation assembly arranged radially outward of the aft fixed portion and including a cam rod with a cams attached thereto and associated with the first tip segment, and showing that the outlet guide vane assembly includes a second actuation assembly arranged radially inward of the leading edge portion and including a cam rod with a cam attached thereto and associated with the first hub segment, and showing that the guide vane further includes a static central portion arranged radially between the first tip segment and the first hub segment.

Another embodiment of an outlet guide vane assembly 528 is shown in FIG. 18. The outlet guide vane assembly 528 is similar to the outlet guide vane assemblies 28, 128, 228, 328, 428 shown in FIGS. 1-17 and described herein. Accordingly, similar reference numbers in the 500 series indicate features that are common between the outlet guide vane assembly 528 and the outlet guide vane assemblies 28, 128, 128, 228, 328, 428. The descriptions of the outlet guide vane assemblies 28, 128, 228, 328, 428 are incorporated by reference to apply to the outlet guide vane assembly 528, except in instances when they conflict with the specific description and the drawings of the outlet guide vane assembly 528.

Similar to the outlet guide vane assemblies 328, 428 described above, the outlet guide vane assembly 528 two actuation assemblies 570, 580. The two actuation assemblies 570, 580 are formed similarly to the two actuation assemblies 370, 380, 470, 480 described above. Unlike the outlet guide vane assemblies 328, 428, the outlet guide vane assembly 528 includes four segments 532A, 532B, 542A, 542B and a central segment 548 that is static, similar to the embodiment shown in FIG. 14 and described above. In some embodiments, the central segment 548 may be omitted such that the vane 530 only includes the four segments 532A, 532B, 542A, 542B.

In order to move all four segments 532A, 532B, 542A, 542B, the first actuation assembly 570 is configured substantially similarly to the first actuation assemblies 370, 470 described above, but instead includes two cams 554A, 554B arranged on the first cam rod 578 and each associated with a respective tip segment 532A, 532B. Similarly, the second actuation assembly 580 includes two cams 557A, 557B arranged on the second cam rod 588 and each associated with a respective hub segment 542A, 542B.

Each segment 532A, 532B, 542A, 542B includes a respective cam actuation rod 555A, 555B, 558A, 558B rotatably extending therefrom and configured to engage with a respective cam 554A, 554B, 557A, 557B. The cams 554A, 554B, 557A, 557B may be selectively clocked such that rotation of the cam rods 578, 588 can cause the segments 532A, 532B, 542A, 542B to move to the same or differing pitch angles. In some embodiments, the segments 532A, 532B, 542A, 542B are rotatably hinged to each other via the same hinge and hinge receiving cavity arrangements as those described above with regard to the outlet guide vane assembly 128.

Figure 19:
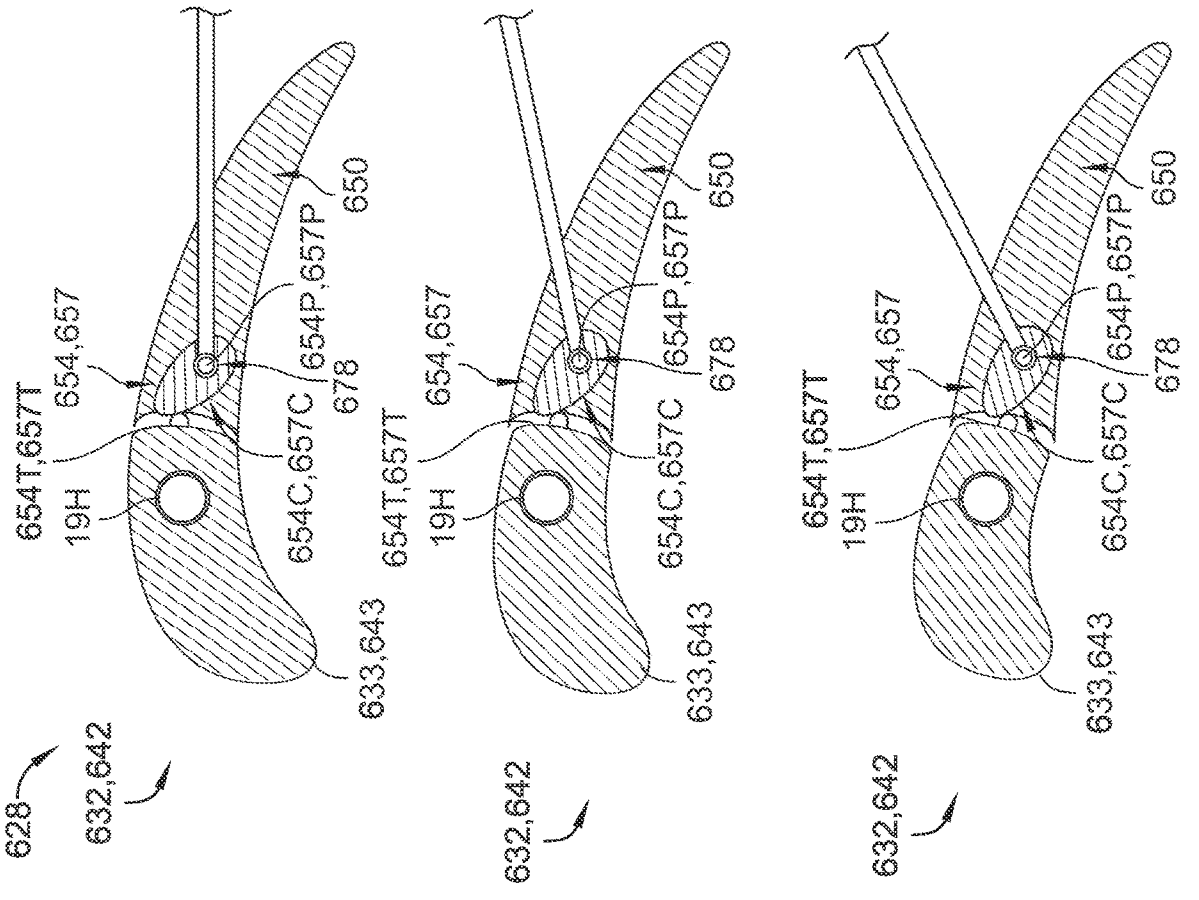
FIG. 19 is a top cross-sectional view of a first variable leading edge outlet guide vane according to a further aspect of the present disclosure, showing that the cams of the cam rod directly engage with a tab formed on the axially aft side of the first tip or hub segment so as to rotate the first tip or hub segment, and showing different rotational positions of the first tip or hub segment based on rotational positions of the cam.

Another embodiment of an outlet guide vane assembly 628 is shown in FIG. 19. The outlet guide vane assembly 628 is similar to the outlet guide vane assemblies 28, 128, 228, 328, 428, 528 shown in FIGS. 1-18 and described herein. Accordingly, similar reference numbers in the 600 series indicate features that are common between the outlet guide vane assembly 628 and the outlet guide vane assemblies 28, 128, 128, 228, 328, 428, 528. The descriptions of the outlet guide vane assemblies 28, 128, 228, 328, 428, 528 are incorporated by reference to apply to the outlet guide vane assembly 628, except in instances when they conflict with the specific description and the drawings of the outlet guide vane assembly 628.

The outlet guide vane assembly 628 is formed similarly to the outlet guide vane assembly 28 described above, in particular including tip and hub segments 632, 642. The outlet guide vane assembly 628 can include one or two actuation assemblies for controlling the segments 632, 642, any of which as are described above. Although FIG. 19 only shows a first actuation assembly 670 having a first actuation arm 674, a first cam rod 678 having cams 654, 657 attached thereto, two cam rods and two actuation arms could also be utilized as described above.

As can be seen in FIG. 19, the first actuation assembly 670 does not include cam actuation rods. Instead, the cams 654, 657 are arranged so as to directly interact with a tab 654T, 657T formed on and extending axially aft of the axially aft end 634, 644 of the segments 632, 642. In some embodiments, the cams 654, 657 may be arranged within cavities 652 formed in the axial aft portion 650, as shown in FIG. 19. When the cams 654, 657 are rotated via rotation of the cam rod 678 in the first rotational direction, the forward cam surface 654C, 657C of the respective cams 654, 657 move against the tab 654T, 657T of the axially aft end 634, 644 of the respective segment 632, 642, thus rotating the respective segment 632, 642 in the second rotational direction. FIG. 19 shows various rotational positions of the cam rod 678 and cams 654, 657, and thus various pitch angles of the segments 632, 642.

A method can include arranging a fan duct 20 circumferentially around a central axis 11, providing a fan 21 comprising a plurality of fan blades 22 that extend radially outward relative to the central axis 11 and that are adapted to rotate about the central axis 11 to force fan exit air 15 toward an aft end of the fan duct 20, and arranging an outlet guide vane assembly 428 in the fan duct 20 axially downstream of the fan 21 and configured to adjust a direction of incoming fan exit air 15 received from the plurality of fan blades 22 and reduce incidence between the outlet guide vane assembly 428 and the fan exit air 15, the outlet guide vane assembly 428 including a first variable leading edge guide vane 430 that extends radially relative to the central axis 11 and includes a leading edge portion 431 and a fixed aft portion 450, the leading edge portion 431 including a first tip segment 432 configured to rotate about a leading edge pitch axis 439 and a first hub segment 442 located radially inward of and separate from the first tip segment 432, the first hub segment 442 configured to independently rotate about the leading edge pitch axis 439 relative to the first tip segment 432.

The method can further include arranging a first actuation assembly 470 relative to the first tip segment 432, the first actuation assembly 470 including a first cam rod 478 and a first cam 454 fixedly coupled to the first cam rod 478, wherein the first cam rod 478 is configured to be selectively rotated so as to selectively rotate the first cam 454, wherein rotation of the first cam 454 causes rotation of the first tip segment 432 about the leading edge pitch axis 439 to a first pitch angle relative to the incoming fan exit air 15, and arranging a second actuation assembly 480 relative to the first hub segment 442, the second actuation assembly 480 including a second cam rod 488 and a second cam 457 fixedly coupled to the second cam rod 488, wherein the second cam rod 488 is configured to be selectively rotated independent of the first cam rod 478 so as to selectively rotate the second cam 457, wherein rotation of the second cam 457 causes rotation of the first hub segment 442 about the leading edge pitch axis 439 to a second pitch angle relative to the incoming fan exit air 15.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected. Moreover, each of the embodiments described herein, including the specific features and characteristics of each embodiment, may be combined with other embodiments as would be understood by one of ordinary skill in the art.

What is claimed is:

1. A fan assembly for a gas turbine engine the fan assembly comprising a fan duct arranged circumferentially around a central axis, a fan comprising a plurality of fan blades that extend radially outward relative to the central axis and that are adapted to rotate about the central axis to force fan exit air toward an aft end of the fan duct, and an outlet guide vane assembly located in the fan duct axially downstream of the fan and configured to adjust a direction of incoming fan exit air received from the plurality of fan blades and reduce incidence between the outlet guide vane assembly and the fan exit air, the outlet guide vane assembly including a first variable leading edge outlet guide vane that extends radially relative to the central axis and includes a leading edge portion and a fixed aft portion, the leading edge portion including a first tip segment configured to rotate about a leading edge pitch axis and a first hub segment located radially inward of and separate from the first tip segment, the first hub segment configured to independently rotate about the leading edge pitch axis relative to the first tip segment, a first actuation assembly including a first cam rod and a first cam fixedly coupled to the first cam rod, wherein the first cam rod is configured to be selectively rotated so as to selectively rotate the first cam, wherein rotation of the first cam causes rotation of the first tip segment about the leading edge pitch axis to a first pitch angle relative to the incoming fan exit air, and a second actuation assembly including a second cam rod and a second cam fixedly coupled to the second cam rod, wherein the second cam rod is configured to be selectively rotated independent of the first cam rod so as to selectively rotate the second cam, wherein rotation of the second cam causes rotation of the first hub segment about the leading edge pitch axis to a second pitch angle relative to the incoming fan exit air.

2. The fan assembly of claim 1, wherein the first and second cams are configured to be selectively clocked to unique rotational positions on the first and second cam rods such that rotation of the first and second cams causes the first tip segment to be rotated to a first pitch angle relative to the incoming fan exit air and the first hub segment to be rotated to a second angle relative to the incoming fan exit air, and wherein the first actuation assembly is configured to rotate the first tip segment to the first pitch angle and the second actuation assembly is configured to rotate the first hub segment to the second pitch angle which is different than the first pitch angle.

3. The fan assembly of claim 2, wherein the first actuation assembly further includes a first cam actuation rod rotatably coupled to the first tip segment and extending axially aft therefrom toward the first cam, and wherein the second actuation assembly further includes a second cam actuation rod rotatably coupled to the first hub segment extending axially aft therefrom toward the second cam.

4. The fan assembly of claim 3, wherein an axially aft end of the first cam actuation rod engages an axially forward facing surface of the first cam such that rotation of the first cam in a first rotational direction causes the axially forward facing surface to move the first cam actuation rod axially forward, and wherein an axially aft end of the second cam actuation rod engages an axially forward facing surface of the second cam such that rotation of the second cam in the first rotational direction causes the axially forward facing surface to move the second cam actuation rod axially forward.

5. The fan assembly of claim 4, wherein the first cam actuation rod is rotatably coupled to the first tip segment at a point offset from the leading edge pitch axis in a circumferential direction such that axially forward movement of the first cam actuation rod rotates the first tip segment in the first rotational direction, and wherein the second cam actuation rod is rotatably coupled to the first hub segment at a point offset from the leading edge pitch axis in the circumferential direction such that axially forward movement of the second cam actuation rod rotates the first hub segment in the first rotational direction.

6. The fan assembly of claim 5, wherein the first tip segment includes a first cam actuation rod receiving recess formed at least partially in an aft side of the first tip segment, wherein the first cam actuation rod is rotatably mounted within the first cam actuation rod receiving recess, wherein the first hub segment includes a second cam actuation rod receiving recess formed at least partially in an aft side of the first hub segment, and wherein the second cam actuation rod is rotatably mounted within the second cam actuation rod receiving recess.

7. The fan assembly of claim 3, wherein the first actuation assembly is arranged radially outward of the fixed aft portion and includes a first actuation head, wherein the first cam rod is fixedly coupled to the first actuation head such that rotation of the first actuation head causes rotation of the first cam rod, wherein the second actuation assembly is arranged radially inward of the fixed aft portion and includes a second actuation head, and wherein the second cam rod is fixedly coupled to the second actuation head such that rotation of the second actuation head causes rotation of the second cam rod.

8. The fan assembly of claim 7, wherein the first actuation assembly further includes a first actuation arm coupled to the first actuation head and extending generally axially aft therefrom, wherein pivoting of the first actuation arm about a rotation axis of the first actuation head causes rotation of the first actuation head which causes rotation of the first cam rod, wherein the second actuation assembly further includes a second actuation arm coupled to the second actuation head and extending generally axially aft therefrom, and wherein pivoting of the second actuation arm about a rotation axis of the second actuation head causes rotation of the second actuation head which causes rotation of the second cam rod.

9. The fan assembly of claim 8, wherein the outlet guide vane assembly further includes a first annular ring extending circumferentially about the central axis, wherein an axially aft end of the first actuation arm is connected to the first annular ring, and wherein circumferential movement of the first annular ring causes movement of the first actuation arm generally circumferentially relative to the first actuation head which causes the first actuation arm to pivot about the rotation axis of the first actuation head which causes rotation of the first actuation head which causes rotation of the first cam rod.

10. The fan assembly of claim 9, wherein the outlet guide vane assembly further includes a second annular ring extending circumferentially about the central axis, wherein an axially aft end of the second actuation arm is connected to the second annular ring, and wherein circumferential movement of the second annular ring causes movement of the second actuation arm generally circumferentially relative to the second actuation head which causes the second actuation arm to pivot about the rotation axis of the second actuation head which causes rotation of the second actuation head which causes rotation of the second cam rod.

11. The fan assembly of claim 1, wherein the first cam rod and the second cam rod are radially spaced apart.

12. The fan assembly of claim 1, wherein the first variable leading edge outlet guide vane further includes a central segment arranged between the first tip segment and the first hub segment such that the first tip segment and the first hub segment are radially spaced apart.

13. The fan assembly of claim 12, wherein the central segment is coupled to and extends axially away from an axially forward side of the fixed aft portion.

14. A fan assembly for a gas turbine engine the fan assembly comprising a fan duct arranged circumferentially around a central axis, a fan adapted to rotate about the central axis to force fan exit air toward an aft end of the fan duct, and an outlet guide vane assembly located in the fan duct axially downstream of the fan and configured to adjust a direction of incoming fan exit air received from the plurality of fan blades and reduce incidence between the outlet guide vane assembly and the fan exit air, the outlet guide vane assembly including a first variable leading edge outlet guide vane that extends radially relative to the central axis and includes a leading edge portion and a fixed aft portion, the leading edge portion including a first tip segment configured to rotate about a leading edge pitch axis and a first hub segment located radially inward of and separate from the first tip segment, the first hub segment configured to independently rotate about the leading edge pitch axis relative to the first tip segment, a first actuation assembly including a first cam, wherein rotation of the first cam is configured to cause rotation of the first tip segment about the leading edge pitch axis to a first pitch angle relative to the incoming fan exit air, and a second actuation assembly including a second cam configured to be selectively rotated independent of the first cam, wherein rotation of the second cam is configured to cause rotation of the first hub segment about the leading edge pitch axis to a second pitch angle relative to the incoming fan exit air.

15. The fan assembly of claim 14, wherein the first actuation assembly further includes a first cam rod, wherein the first cam is fixedly coupled to the first cam rod, wherein the first cam rod is configured to be selectively rotated so as to selectively rotate the first cam, wherein the second actuation assembly further includes a second cam rod, wherein the second cam is fixedly coupled to the second cam rod, and wherein the second cam rod is configured to be selectively rotated independent of the first cam rod so as to selectively rotate the second cam.

16. The fan assembly of claim 15, wherein the first and second cams are configured to be selectively clocked to unique rotational positions on the first and second cam rods such that rotation of the first and second cams causes the first tip segment to be rotated to a first pitch angle relative to the incoming fan exit air and the first hub segment to be rotated to a second angle relative to the incoming fan exit air.

17. The fan assembly of claim 16, wherein the first actuation assembly further includes a first cam actuation rod rotatably coupled to the first tip segment and extending axially aft therefrom toward the first cam, and wherein the second actuation assembly further includes a second cam actuation rod rotatably coupled to the first hub segment extending axially aft therefrom toward the second cam.

18. The fan assembly of claim 17, wherein an axially aft end of the first cam actuation rod engages an axially forward facing surface of the first cam such that rotation of the first cam in a first rotational direction causes the axially forward facing surface to move the first cam actuation rod axially forward, and wherein an axially aft end of the second cam actuation rod engages an axially forward facing surface of the second cam such that rotation of the second cam in the first rotational direction causes the axially forward facing surface to move the second cam actuation rod axially forward.

19. The fan assembly of claim 18, wherein the first cam actuation rod is rotatably coupled to the first tip segment at a point offset from the leading edge pitch axis in a circumferential direction such that axially forward movement of the first cam actuation rod rotates the first tip segment in the first rotational direction, and wherein the second cam actuation rod is rotatably coupled to the first hub segment at a point offset from the leading edge pitch axis in the circumferential direction such that axially forward movement of the second cam actuation rod rotates the first hub segment in the first rotational direction.

20. A method comprising arranging a fan duct circumferentially around a central axis, providing a fan comprising a plurality of fan blades that extend radially outward relative to the central axis and that are adapted to rotate about the central axis to force fan exit air toward an aft end of the fan duct, arranging an outlet guide vane assembly in the fan duct axially downstream of the fan and configured to adjust a direction of incoming fan exit air received from the plurality of fan blades and reduce incidence between the outlet guide vane assembly and the fan exit air, the outlet guide vane assembly including a first variable leading edge guide vane that extends radially relative to the central axis and includes a leading edge portion and a fixed aft portion, the leading edge portion including a first tip segment configured to rotate about a leading edge pitch axis and a first hub segment located radially inward of and separate from the first tip segment, the first hub segment configured to independently rotate about the leading edge pitch axis relative to the first tip segment, arranging a first actuation assembly relative to the first tip segment, the first actuation assembly including a first cam rod and a first cam fixedly coupled to the first cam rod, wherein the first cam rod is configured to be selectively rotated so as to selectively rotate the first cam, wherein rotation of the first cam causes rotation of the first tip segment about the leading edge pitch axis to a first pitch angle relative to the incoming fan exit air, and arranging a second actuation assembly relative to the first hub segment, the second actuation assembly including a second cam rod and a second cam fixedly coupled to the second cam rod, wherein the second cam rod is configured to be selectively rotated independent of the first cam rod so as to selectively rotate the second cam, wherein rotation of the second cam causes rotation of the first hub segment about the leading edge pitch axis to a second pitch angle relative to the incoming fan exit air.

* * * * *